(12) United States Patent
Jolley

(10) Patent No.: US 12,409,017 B2
(45) Date of Patent: *Sep. 9, 2025

(54) SYSTEMS AND METHODS FOR PROVIDING AN ORTHODONTIC SPRING

(71) Applicant: Elliott Jolley, Vernal, UT (US)

(72) Inventor: Elliott Jolley, Vernal, UT (US)

( * ) Notice: Subject to any disclaimer, the term of this patent is extended or adjusted under 35 U.S.C. 154(b) by 660 days.

This patent is subject to a terminal disclaimer.

(21) Appl. No.: 17/671,064

(22) Filed: Feb. 14, 2022

(65) Prior Publication Data

US 2022/0160471 A1 May 26, 2022

Related U.S. Application Data

(63) Continuation of application No. 17/093,471, filed on Nov. 9, 2020, now Pat. No. 11,246,682.

(51) Int. Cl.
*A61C 7/36* (2006.01)

(52) U.S. Cl.
CPC ...................................... *A61C 7/36* (2013.01)

(58) Field of Classification Search
CPC ........................................................ A61C 7/36
USPC .......................................................... 433/19
See application file for complete search history.

(56) References Cited

U.S. PATENT DOCUMENTS

| | | | |
|---|---|---|---|
| 3,618,214 A | 11/1971 | Armstrong | |
| 4,315,739 A | 2/1982 | Cain | |
| 10,123,855 B1* | 11/2018 | Coleman | A61C 7/12 |
| 2008/0138759 A1* | 6/2008 | Kravitz | A61C 7/22 |
| | | | 433/21 |
| 2010/0022821 A1 | 1/2010 | Dubi et al. | |
| 2010/0307511 A1 | 12/2010 | Meade | |
| 2018/0116767 A1 | 5/2018 | Abels et al. | |

FOREIGN PATENT DOCUMENTS

| | | |
|---|---|---|
| EP | 0579422 A2 | 1/1994 |
| WO | 2015157472 A1 | 10/2015 |

* cited by examiner

*Primary Examiner* — Nicholas D Lucchesi

(74) *Attorney, Agent, or Firm* — Bryant J. Keller; John Oldroyd; Kirton McConkie

(57) ABSTRACT

Systems and methods for moving teeth are discussed. In particular, an orthodontic spring that is configured to extend between an upper and lower dental arch of a patient is discussed. While the spring can include any suitable feature, in some cases, it includes a tension coil spring, a first coupler that is disposed at a first end of the tension coil spring and that is configured to couple to a first anchor that is coupled to the upper dental arch, and a second coupler that is disposed at a second end of the tension coil spring and that is configured to couple to a second anchor that is coupled to the lower dental arch. In some cases, the tension coil spring, the first coupler, and the second coupler comprise one continuous wire. In some cases, the tension coil springs tapers at its ends. Additional implementations are discussed herein.

20 Claims, 12 Drawing Sheets

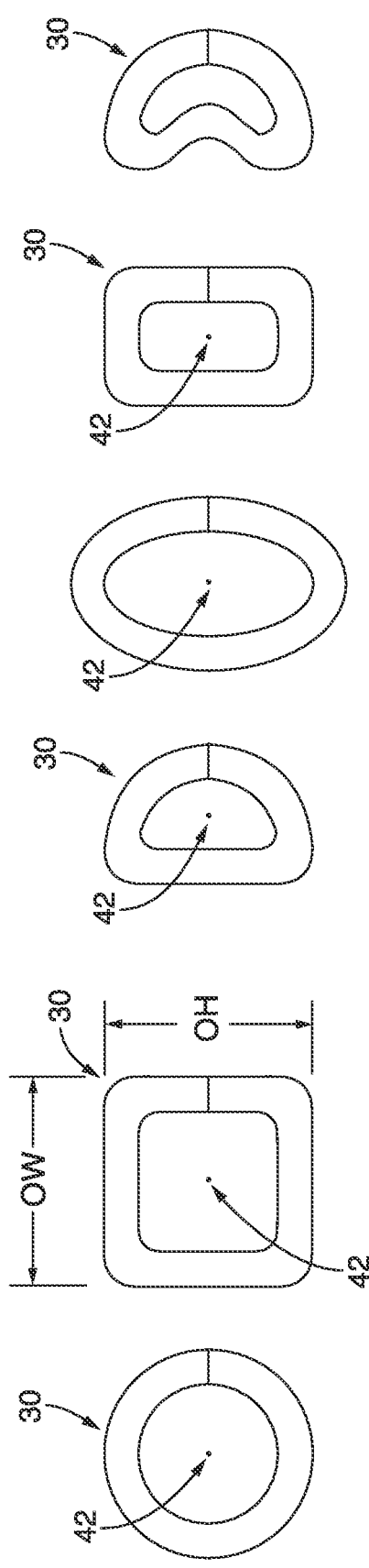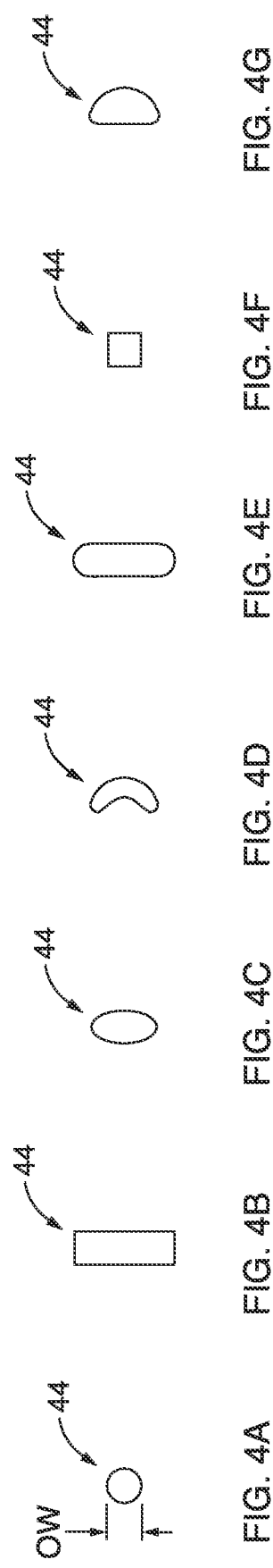

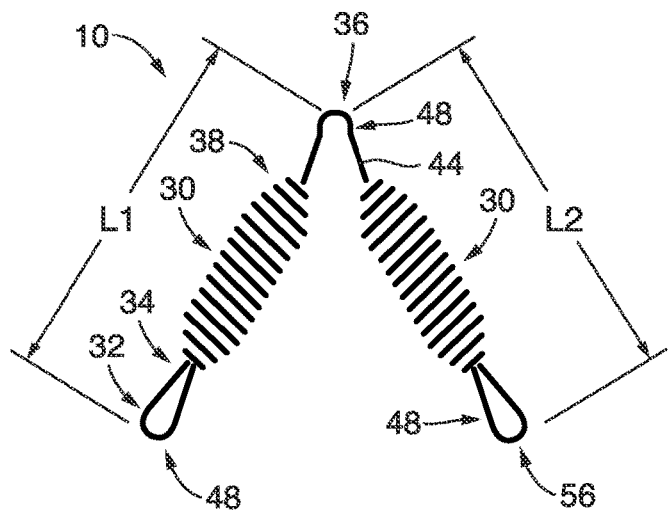
FIG. 8A
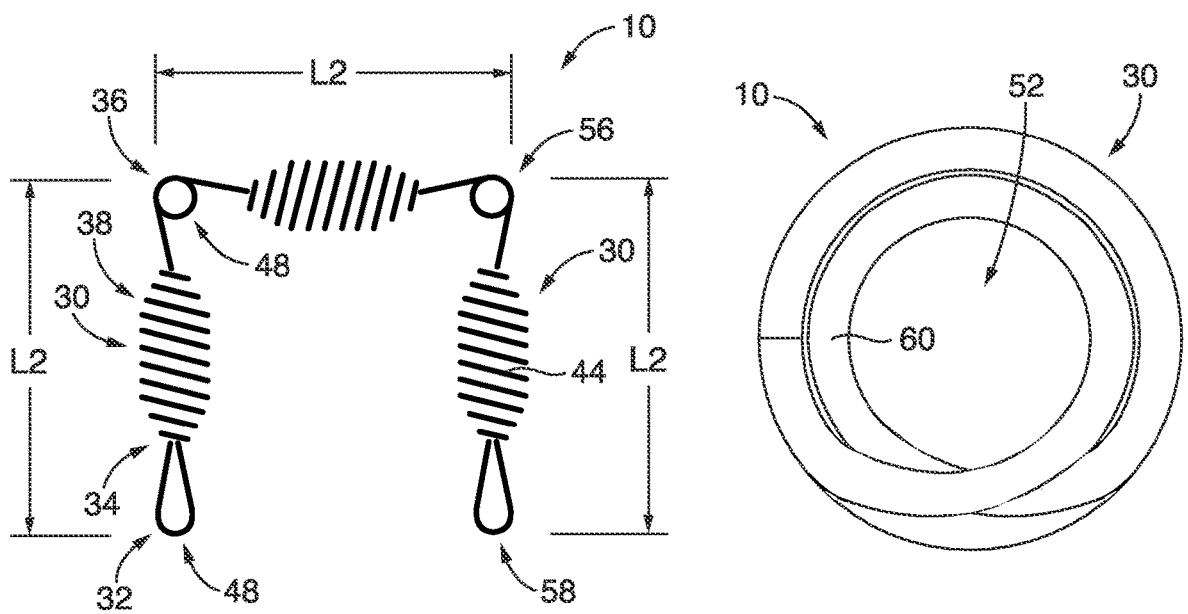
FIG. 8B
FIG. 8C

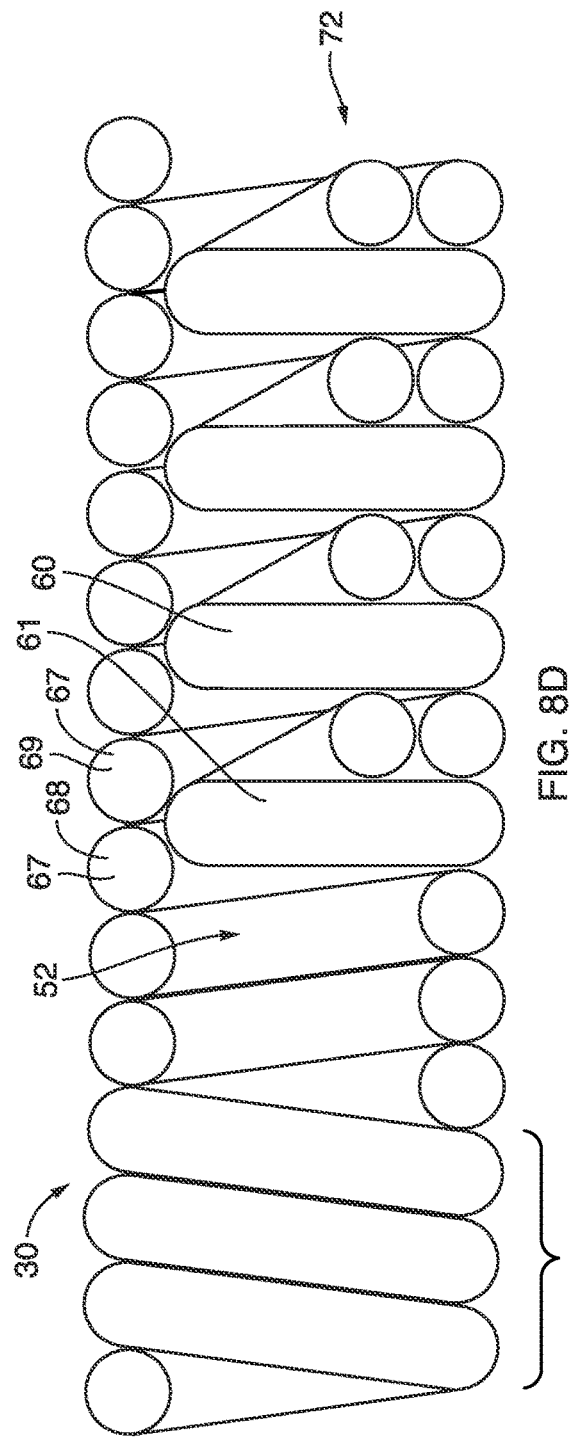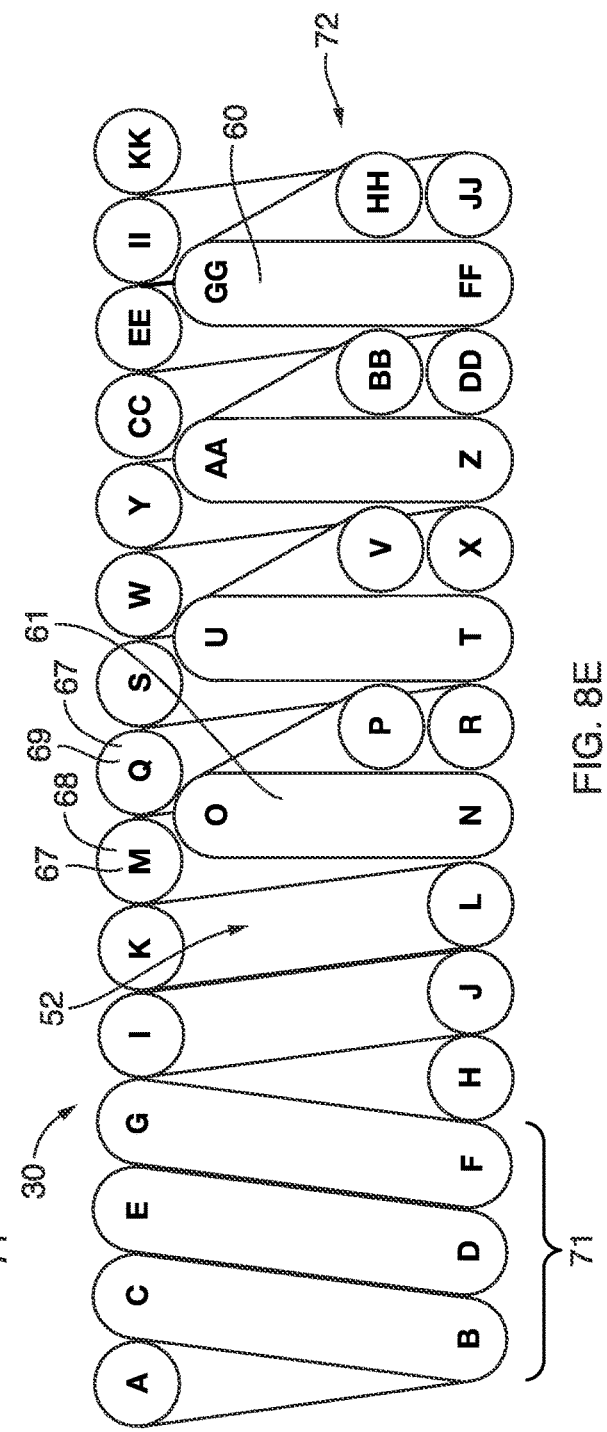

SYSTEMS AND METHODS FOR PROVIDING AN ORTHODONTIC SPRING

CROSS-REFERENCE TO RELATED APPLICATION

This is a continuation of U.S. patent application Ser. No. 17/093,471, filed Nov. 9, 2020, and entitled "SYSTEMS AND METHODS FOR PROVIDING AN ORTHODONTIC SPRING"; the entire disclosure of which is hereby incorporated by reference.

BACKGROUND OF THE INVENTION

1. Field of the Invention

The present invention relates to orthodontics. In particular, some implementations relate to systems and methods for providing tension, via one or more tension coil springs, between a person's maxilla and mandible in order to correct occlusion between the maxilla and mandible, to change spacing between teeth, and/or to align teeth of the maxilla and mandible.

2. Background and Related Art

Dental braces (or braces, as they are often called) are used for a variety of purposes, including to align and straighten teeth; to fix gaps between teeth; to position teeth to help a patient's bite; to correct underbites, overbites, cross bites, open bites, deep bites, and malocclusions; and/or to otherwise fix a variety of problems with a patient's teeth or the patient's upper or lower dental arches. While there are several different types of dental braces, some conventional braces include multiple brackets that are bonded (or otherwise attached) to a patient's teeth and one or more archwires that are coupled to the brackets and that are shaped and configured to bias one or more of the patient's teeth so as to reposition the teeth.

While dental braces have been used for many years, and while such braces have proven to provide a reliable method for repositioning teeth, braces are not without their shortcomings. In some cases, braces require some care by the patient (or his or her caregiver). In such cases, where the patient (or his or her caregiver) neglects to take such care, the braces can be less effective, and (as such) may require the patient to use the braces for a longer period of time to allow the braces to accomplish their intended purpose. Additionally, in some cases, as a patient wears braces, the patient (or his or her caregiver) is required to regularly place fingers in the patient's mouth (e.g., to adjust, remove, or replace elastics), which can be unsanitary.

Thus, while techniques currently exist that are used to correct flaws in teeth and dental arches through the use of dental braces, challenges still exist with some conventional brace technologies, including those challenges listed above. Accordingly, it would be an improvement in the art to augment or even replace current techniques with other techniques.

SUMMARY OF THE INVENTION

The present invention relates to systems and methods for correcting flaws in tooth alignment and/or dental arch occlusion. In particular, an orthodontic spring that is configured to extend between an upper and lower dental arch is discussed. While the described orthodontic spring can include any suitable feature, in some cases, it includes a first tension coil spring (or tension spring), a first coupler that is disposed at a first end of the first tension coil spring and that is configured to couple to a first anchor that is coupled to a first dental arch. In some cases, the orthodontic spring further comprises a second coupler that is disposed at a second end of the first tension coil spring and that is configured to couple to a second anchor that is coupled to a second dental arch. In some cases, the first tension coil spring, the first coupler, and the second coupler all comprise one continuous wire. In some cases, the first tension coil spring tapers at its first and/or second ends. Indeed, in some cases, the tension coil spring tapers between a portion of the spring that has a widest outer diameter and/or outer width (e.g., a center portion of a length of the spring) and the first coupler (at the first end) and the second coupler (at the second end).

With reference to the tension coil spring, the tension spring can have any suitable component or characteristic that allows the orthodontic spring to replace one or more conventional orthodontic elastics. For instance, the tension coil spring can have any suitable shape. Indeed, in some implementations, circular or helical coils in the tension spring provide that spring with a cylindrical shape. In some other implementations, however, instead of being cylindrical, the tension spring has a prismatic shape being substantially D-shaped, triangular, rectangular, square, elliptical, oval, polygonal, C-shaped, egg-shaped, rounded-raindrop shaped, and/or any other suitable prismatic shape.

The wire that is used to create the tension coil spring can also have any suitable cross-sectional shape (e.g., when taken at a cross-section that is perpendicular to a length of the wire when straight and before it is coiled). Some non-limiting examples of suitable shapes of the wire include cross-sectional shapes that are substantially circular, elliptical, ovular, square, rectangular, triangular, polygonal, rounded raindrop, C-shaped, D-shaped, symmetrical, asymmetrical, and/or any other suitable shape.

The tension coil spring can have any suitable outer diameter or width (where the tension coil spring is not cylindrical). In some implementations, the tension coil spring has a maximum outer diameter or width that is less that about 6 mm (or any suitable amount smaller). Indeed, in some implementations, the maximum outer diameter of the tension coil spring is less than about 4 mm (e.g., about 3 mm±1.5 mm). Similarly, in some cases in which the tension coil spring has a rectangular prismatic shape, the tension coil spring is about 4 mm (±1.5 mm) by about 2 mm (±1.5 mm), along a length of the tension coil spring.

In some cases, the tension coil spring comprises a closed coiled spring in which the spring's coils are tightly wound such that multiple coils in the tension spring contact each other when the spring is at rest (e.g., the coils have a low pitch). In some other cases, however, the tension coil spring comprises an open coil spring, or the spring has relatively loosely wound coils such that the spring has spaces between at least some of the coils when the spring is at rest (e.g., the coils have a high pitch).

While the entire orthodontic spring (e.g., the spring and its couplers) can be any suitable size, in some implementations, the entire length of the spring (at rest) is between about 2 mm and about 40 mm (or within any subrange thereof). Indeed, in some implementations, the entire length of the spring (e.g., from an end of the first coupler to an end of the second coupler) is less than about 30 mm. Indeed, in some cases, the entire length of the resting orthodontic spring is about 27 mm. In other cases, the resting orthodontic spring is about 23 mm in length. In still other embodiments, the resting orthodontic spring is about 20 mm long.

With reference to the couplers, the couplers (e.g., the first and second couplers) can have any suitable component and characteristic that allows the couplers to couple the described orthodontic spring to multiple anchors. For instance, some implementations of the couplers extend from the tension coil spring so as to be parallel with a longitudinal or radial axis of the tension coil spring (e.g., with a coupler extending near the longitudinal axis of, at a lateral side of, and/or from any other suitable portion of the tension coil spring).

In some other implementations, one or more of the couplers are curved, bent, bowed, and/or otherwise diverge laterally from the longitudinal, central, or radial axis of the tension coil spring. In some such implementations, the first and second couplers diverge to the same lateral side of the tension coil spring, such that the couplers are configured to couple the orthodontic spring to multiple anchors while helping to hold the tension coil spring away from one or more archwires, gums, and/or other objects that could interfere with the tension coil spring as it functions.

Where the first and/or second couplers are formed from the same continuous wire as the tension coil spring, the couplers can each extend from the tension coil spring in any suitable location and manner. Indeed, in some implementations, a portion of the continuous wire forms a coupler by extending away from an end of the tension coil spring, beginning near the longitudinal or radial axis of the spring, and bending to form a loop. In some such implementations, after forming the loop, an end of the continuous wire extends back into a lumen of the tension coil spring and/or is coupled to a portion of the orthodontic spring.

In some other implementations, a radial axis of one or more coils of the tension coil spring that act as a coupler are offset from the longitudinal, radial, or central axis of a majority of the coils in the tension coil spring. Where the radial axis of the coupler (or a coupler coil or coils) is offset from the radial (or longitudinal) axis of the majority of the coils of the tension spring, the two axes can be offset from each other by any suitable angle. Indeed, in some cases, when the orthodontic spring is at rest, the radial axis of the first and/or second couplers (or coupler coils) run substantially perpendicular to the longitudinal or radial axis of the majority of the coils in the tension coil spring.

In some implementations, in addition to the first tension coil spring, the first coupler, and the second coupler, the orthodontic spring further includes a second tension coil spring having its own first end and second end. In some such implementations, the orthodontic spring further includes a third coupler that is configured to couple to the same dental arch as the first coupler. Additionally, in some such implementations, the second coupler is disposed at the first end of the second tension coil spring and the third coupler is disposed at the second end of the second tension coil spring. Moreover, in some such implementations, the first coupler, the first tension coil spring, the second coupler, the second tension coil spring, and the third coupler comprise the one continuous wire. While such an orthodontic spring can have any suitable shape, in some cases, it has a V-shaped appearance.

In addition to the foregoing, the described orthodontic spring can be modified in any suitable manner. Indeed, in some cases, in addition to having a first and/or second tension coil spring, some implementations of the orthodontic spring have 3, 4, 5, 6, or more tension coil springs. Moreover, in some cases, in addition to having a first, second, and/or third coupler, some implementations of the orthodontic spring have 4, 5, 6, 7, or more couplers.

For instance, in addition to the first and second couplers that respectively extend from the first and second ends of the first tension coil spring, some implementations of the described orthodontic spring include a second and third tension coil spring. Moreover, some such implementations include a third and fourth coupler, with the second coupler being disposed between the first and second tension coil springs, the third coupler being disposed between the second and third tension coil springs, and the fourth coupler being disposed at an end of the third tension coil spring. In this regard, while some implementations of the described orthodontic spring comprise multiple wires or other components that are coupled together, in some implementations, the first coupler, the first tension coil spring, the second coupler, the second tension coil spring, the third coupler, the third tension coil spring, and the fourth coupler are all formed from one continuous wire The described orthodontic spring can be used in any suitable manner. In this regard, some implementations of the orthodontic spring are configured to replace dental elastics (e.g., Class II elastics, Class III elastics, Class II triangle elastics, Class III triangle elastics, seating elastics, V elastics, triangle elastics, box elastics, canine elastics, and any other suitable type of elastics). Moreover, while the described orthodontic springs can couple to braces in any suitable manner, in some implementations, they couple to any suitable anchor on the braces and/or archwires (e.g., one or more pre-formed or custom archwires helices, archwire loops, stops, hooks, soldered hooks, crimpable hooks, drop in hooks, posts, crimpable posts, metal ligature tie hooks (such as a Kobayashi tie), pins, drop in pins, clasps, bands, cleats, lugs, buttons, eyelets, wings, brackets, and/or any other suitable object or objects that are capable of coupling a coupler of the orthodontic spring to a portion of a dental brace and/or to a dental arch). Indeed, in some cases, the first or second coupler is coupled to a dental bracket via a hook and/or any other suitable element. In some such cases, an archwire is disposed on and/or in the bracket and an archwire coupler (e.g., an elastic or metal ligature, elastic or metal single tie, metal ligature tie hooks (such as a Kobayashi tie), pin, twisted wire, braided wire, laced wire, elastic thread, power chain, and/or any other suitable coupler that is configured to couple the archwire to the bracket and/or any other suitable portion of a brace) is used to secure the archwire to the bracket (or elsewhere). More specifically, in some such cases, a portion of the first or second coupler is sandwiched between a portion of the archwire and a portion of the archwire coupler so as to couple the orthodontic spring to the bracket. Thus, in some embodiments, the orthodontic spring is configured to remain in place during the interval between visits to an orthodontist's office. Thus, unlike some conventional orthodontic elastics that are regularly removed (e.g., when they break, when they lose their elasticity, during meals, etc.) and are not immediately replaced (e.g., due to forgetfulness and/or a lack of desire), some implementations of the described orthodontic spring are configured to retain their elasticity and remain in place for extended periods of time. As a result, some such implementations are able to provide the desired orthodontic results more quickly and/or more effectively than may be achieved with some conventional elastics.

While the described orthodontic spring may be particularly useful with traditional metal braces that include an orthodontic archwire that is coupled to multiple brackets, which are in turn coupled to multiple teeth, the described orthodontic spring can be used with any other suitable type of braces and/or orthodontic equipment. Indeed, in some implementations, the described orthodontic spring is used with ceramic braces, lingual braces, clear plastic aligners (e.g., INVISALIGN™ orthodontics), tooth bands, self-ligating braces, bars, arms, occlusal correctors (such as a Carriere appliance), Class II correctors, Class III correctors, holding arches, lip bumpers, space maintainers, Wilson arches, retainers, anti-snoring devices, mouth guards, night guards, growth modification devices, temporary anchorage devices (TAD), headgear systems, and/or any other suitable type of orthodontic equipment in which the first coupler of the described orthodontic spring is able to couple to a first anchor and the spring's second coupler is able to couple to a second anchor to help move and/or align teeth and/or dental arches and/or to correct dental occlusion.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the described systems and methods will be rendered by reference to specific embodiments thereof, which are illustrated in the appended drawings. Understanding that the drawings depict only representative embodiments of the present invention and are not, therefore, to be considered as limiting the scope of the invention, the present invention will be described and explained with additional specificity and detail through the use of the accompanying drawings in which:

FIGS. 3A-3F depict cross-sectional views of various embodiments of the orthodontic spring;

FIGS. 4A-4G depict some cross-sectional views of a wire that is used to create the orthodontic spring in accordance with some embodiments;

FIG. 8A depicts a side elevation view of a V-shaped orthodontic spring in accordance with a representative embodiment;

FIG. 8B illustrates a front elevation view of the orthodontic spring in accordance with a representative embodiment;

FIG. 8C depicts a cross-sectional view of a tension spring of the orthodontic spring, wherein the tension spring comprises a continuous wire that forms both an outer coil and an inner coil in accordance with a representative embodiment;

FIGS. 8D-8E each show a partial cross-sectional view where the tension spring comprises the continuous wire that forms both the outer coil and the inner coil in accordance with some representative embodiments;

DETAILED DESCRIPTION OF THE INVENTION

The present invention relates to systems and methods for correcting flaws in tooth alignment and/or dental arch occlusion. In particular, an orthodontic spring that is configured to extend between an upper and lower dental arch is discussed. While the orthodontic spring can include any suitable feature, in some cases, it includes a first tension coil spring, a first coupler that is disposed at a first end of the first tension coil spring and that is configured to couple to a first anchor that is coupled to a first dental arch. In some cases, the orthodontic spring further comprises a second coupler that is disposed at a second end of the first tension coil spring and that is configured to couple to a second anchor that is coupled to a second dental arch. In some cases, the first tension coil spring, the first coupler, and the second coupler all comprise one continuous wire. In some cases, the first tension coil spring tapers at its first and second ends. Indeed, in some cases, the tension coil spring tapers between a portion of the spring that has a widest outer diameter and/or outer width (e.g., a center portion of a length of the tension spring) and the first coupler (at the first end) and the second coupler (at the second end).

Figure 1A:
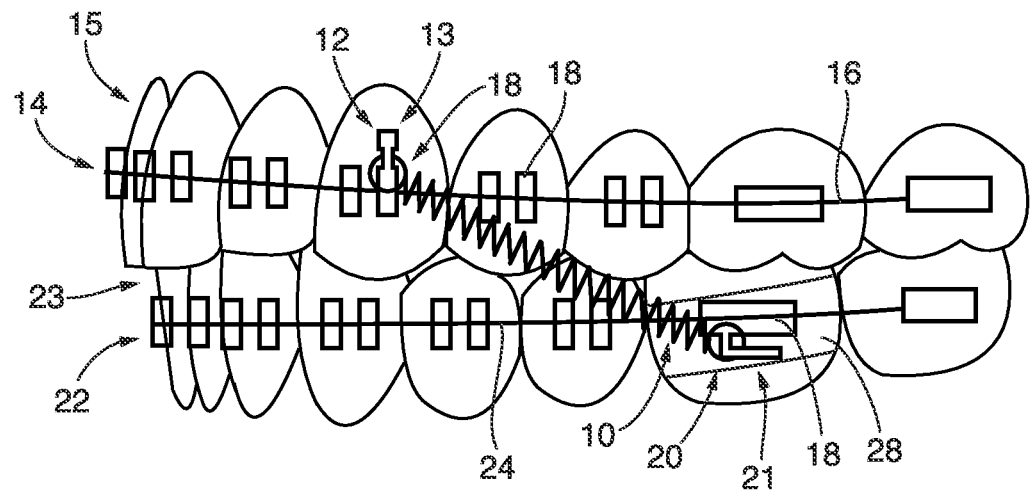
FIGS. 1A-1D each depict a side view of a maxilla (or upper dental arch) and a mandible (or lower dental arch) that each have dental braces and/or a Carriere appliance, wherein an orthodontic spring extends from the braces and/or appliance on the maxilla to the braces and/or appliance on the mandible in accordance with some representative embodiments.

When a patient wears braces, one or more additional auxiliary appliances (e.g., orthodontic elastics, comprising latex and/or or non-latex elastic bands) are often prescribed by the orthodontist for the correction of the patient's bite (occlusion). The patient (and/or a caregiver) then is responsible to connect fresh elastics to the braces or archwires multiple times a day. In general, however, the described systems and methods relate to an orthodontic spring that is configured to replace orthodontic elastics that extend from braces on an upper jaw (or upper dental arch or maxilla) to braces on a lower jaw (or lower dental arch or mandible) of a patient. By way of non-limiting illustration, FIG. 1A shows that, in some embodiments, the described orthodontic spring 10 is configured to extend between: (a) a first anchor 12 on an upper set of braces 14 on an upper dental arch 15, with the upper braces comprising a first archwire 16 and multiple orthodontic brackets 18 and (b) a second anchor 20 on a lower set of braces 22 on a lower dental arch 23, with the lower braces comprising a second archwire 24 and additional brackets 18.

Where the described orthodontic spring 10 is configured to couple to one or more anchors (e.g., anchors 12 and 20) on an upper 15 and/or lower 23 dental arch of a patient, the anchors can comprise any suitable component that is configured to be coupled to the orthodontic spring (e.g., via a coupler on the orthodontic spring). Some examples of suitable anchors (or orthodontic spring anchors) include, but are not limited to, one or more hooks, sliding hooks, spring-loaded sliding hooks, wire hooks, bracket hooks, crimpable hooks, crimpable ball hooks, crimpable split bi-directional ball hooks, ball hooks, K-hooks, catches, traction hooks, clasps, poking hooks, posted archwires, crimpable stops, Carriere appliances, pre-formed or custom archwire helices, archwire loops, stops, hooks, soldered hooks, crimpable hooks, drop in hooks, posts, crimpable posts, metal ligature tie hooks (such as a Kobayashi tie), pins, drop in pins, clasps, bands, cleats, lugs, buttons, eyelets, wings, bars, arms, occlusal correctors (such as a Carriere appliance), Class II correctors, Class III correctors, holding arches, lip bumpers, space maintainers, Wilson arches, retainers, anti-snoring devices, mouth guards, night guards, growth modification devices, temporary anchorage devices (TADs), and/or any other suitable fasteners that are configured to couple the described orthodontic spring to a portion of an upper and/or lower dental arch of a patient.

Figure 1B:
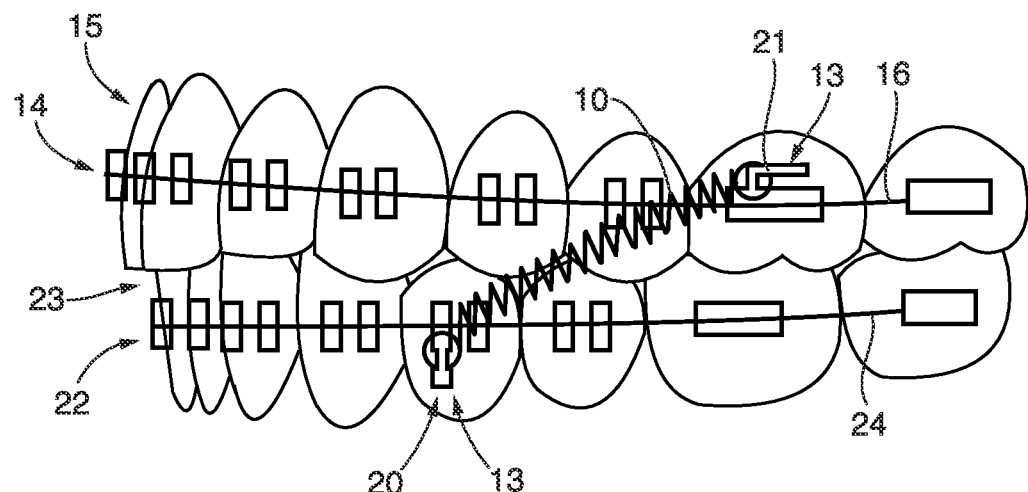
Figure 1C:
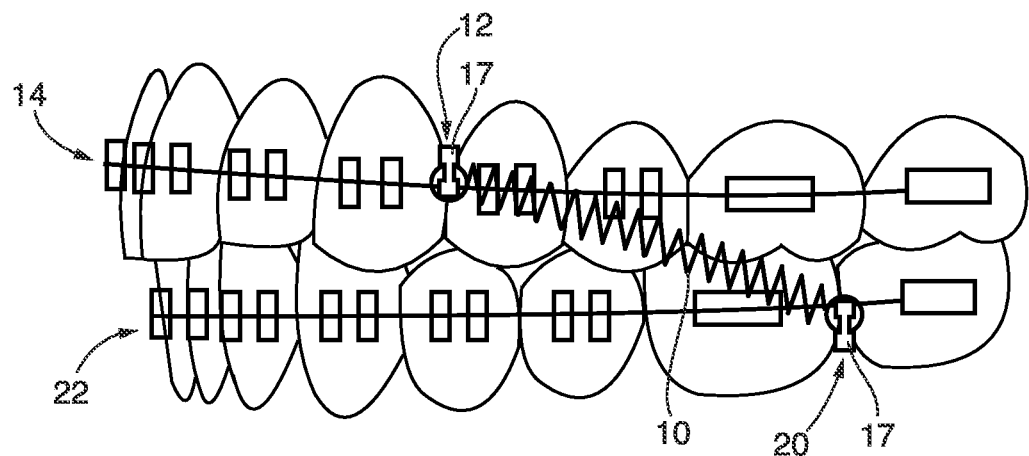
Figure 1D:
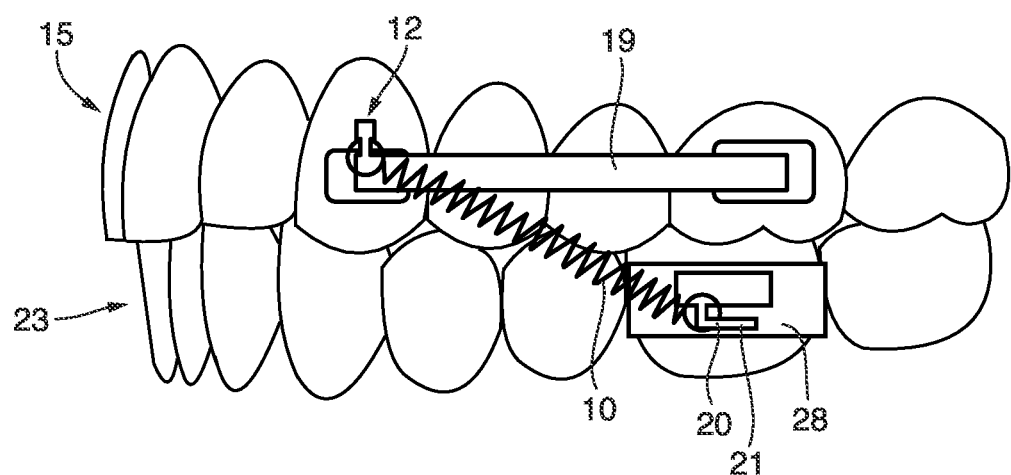

By way of non-limiting illustration, FIG. 1A shows an embodiment in which the orthodontic spring 10 is coupled to a ball hook 13 that functions as the first anchor 12 and to a poking hook 21 that functions as the second anchor 20. Similarly, FIG. 1B shows an embodiment in which the orthodontic spring 10 is coupled to a first anchor 12 (e.g., a poking hook 21) on the upper dental arch 15, and to a second anchor 20 (e.g., a ball hook 13) on the lower dental arch 23. Additionally, FIG. 1C shows an embodiment in which the orthodontic spring 10 extends between a first 12 and a second 20 anchor, wherein one or more of the anchors comprises a posted archwire 17 (e.g., a hook directly soldered to an archwire) and/or to a crimpable stop (e.g., an anchor that is crimped onto an archwire). Moreover, FIG. 1D shows an embodiment in which the orthodontic spring 10 is coupled to a first anchor 12 on a Carriere appliance 19 (e.g., an arm of metal, ceramic, and/or any other suitable material that is bonded to one or more teeth (e.g., the first molar and the canine and/or any other suitable tooth)) that is on a first dental arch (e.g., the upper dental arch 15) and to a second anchor 20 (e.g., a poking hook 21 on an orthodontic band 28). In short, the orthodontic coil can be coupled to any suitable anchors, at any suitable angle, and in any other suitable manner.

Where the orthodontic spring 10 couples to one or more anchors (e.g., the first 12 and/or second 20 anchors), the anchors can be coupled to any other suitable component that allows the anchors to be coupled to one or more teeth and/or dental arches. Indeed, in some embodiments, one or more anchors are coupled to one or more orthodontic brackets, molar bands, buccal tubes, orthodontic bands, orthodontic archwires (e.g., archwires 16 and 24), clear aligners, orthodontic retainers, headgear components, bars, arms, occlusal correctors (such as Carriere appliances), Class II correctors, Class III correctors, holding arches, lip bumpers, space maintainers, Wilson arches, anti-snoring devices, mouth guards, night guards, growth modification devices, temporary anchorage devices (TADs), and/or any other suitable components that are configured to directly or indirectly couple one or more anchors to one or more of a patient's teeth or dental arches. By way of non-limiting illustration, FIG. 1A shows an embodiment in which the first anchor 12 is coupled to an orthodontic bracket (or bracket) 18 and in which the second anchor 20 is coupled to a bracket 18 and/or an orthodontic band 28. Thus, in some embodiments, the described orthodontic spring is configured to be used with one or more conventional coupling devices that are made for orthodontic elastics. Accordingly, in some such embodiments, the described orthodontic spring can easily be used interchangeably with one or more orthodontic elastics.

Figure 2A:
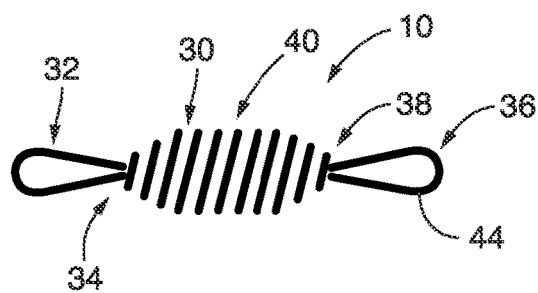
FIGS. 2A-2D show front elevation views of different representative embodiments of the orthodontic spring.
Figure 2B:
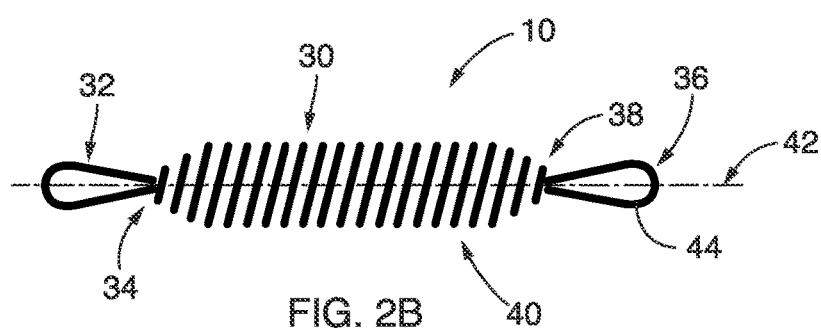
Figure 2C:
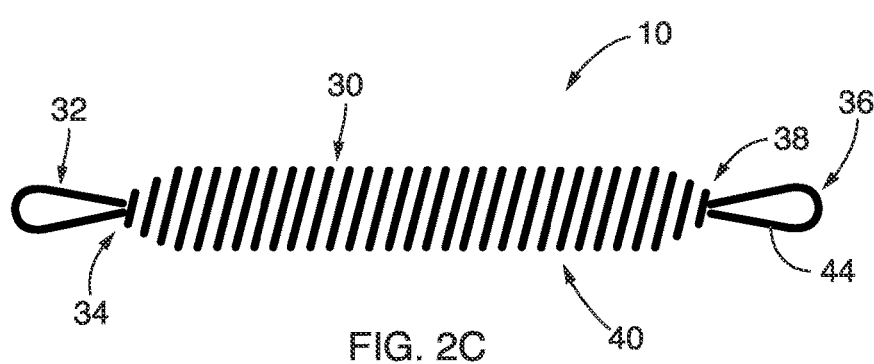

With specific reference now to the orthodontic spring 10, the spring can comprise any suitable component or characteristic that allows it to provide tension between an upper 15 and lower 23 dental arch and/or between teeth in a patient's mouth. By way of non-limiting illustration, FIG. 2A shows that, in some embodiments, the orthodontic spring 10 comprises one or more tension coil springs 30 that have a first coupler 32 disposed at a first end 34 of the tension coil spring 30 and a second coupler 36 disposed at a second end 38 of the tension coil spring 30.

With respect to the tension coil spring 30, the tension spring can have any suitable characteristic that allows the orthodontic spring 10 to function as described herein. For instance, the tension coil spring can have any suitable shape that allows it to function as described. In some embodiments, a portion of the tension coil spring has a cylindrical shape, an elliptical straw shape, a rectangular prismatic shape, a square prismatic shape, a triangular prismatic shape, a polygonal prismatic shape, a C-Shaped prismatic shape, a D-shaped prismatic shape, an egg-shape, a teardrop-shape, a pill shape, an undulated cylindrical shape, a conical shape, a double conical shape comprising two conical portions that meet at a widest portion of the tension coil spring, and/or any other suitable shape. By way of non-limiting example, FIGS. 2A-2D show some embodiments in which a portion of the tension coil spring 30 has a cylindrical portion 40.

Additionally, FIGS. 3A-3F show that some embodiments of the tension coil spring 30 have a cross-sectional view (e.g., when such cross-sectional view is taken perpendicular to a longitudinal (or radial) axis 42 of the tension coil spring 30) that is circular (e.g. as shown in FIG. 3A), square (e.g., as shown in FIG. 3B), D-shaped (e.g., as show in FIG. 3C), elliptical in shape (e.g., as shown in FIG. 3D), rectangular (e.g., as shown in FIG. 3E), and/or crescent-moon shape (e.g., as shown in FIG. 3F). In this regard, the shape of the tension coil spring can provide the orthodontic spring 10 with one or more features. Indeed, in some cases, the tension coil spring's shape helps the tension coil to function without causing pain to a patient's gums and/or cheeks. For instance, where the tension coil spring is cylindrical, it can be free from having sharp corners that can dig into a patient's gums and/or inner cheeks. Similarly, where the tension coil spring has a D-shaped prismatic portion, a substantially flat portion of the length of the spring can be configured to face towards the patients' teeth and/or gums, while the rounded portion of the tension spring's length can face towards the patient's inner cheeks so as to be comfortable for the patient.

Figure 2D:
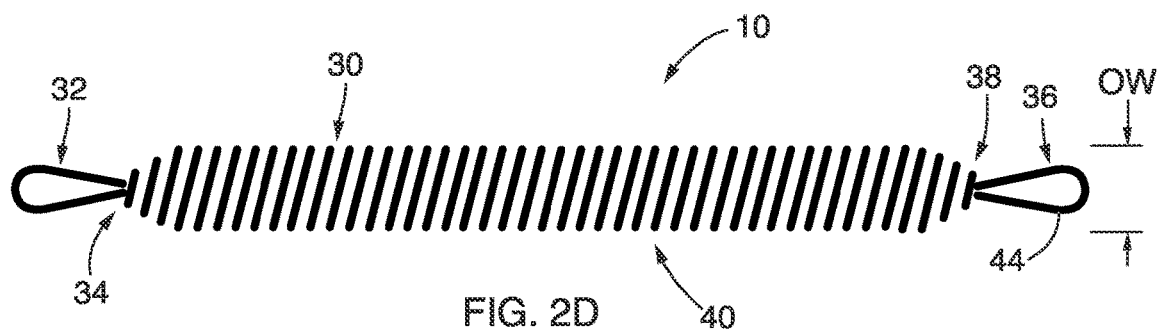

In some embodiments, the tension coil spring 30 has a constant outer diameter (or width) along at least a portion of its longitudinal axis 42. By way of non-limiting embodiments, FIG. 2D shows an embodiment in which a majority of a length of the tension coil spring 30 has a substantially constant outer diameter (or outer width OW).

Moreover, in some embodiments, the outer diameter (or outer width OW) of the tension coil spring 30 varies along one or more portions of tension spring's longitudinal axis 42. In this regard, the outer diameter or width of the tension coil spring can vary in any suitable manner, including, without limitation, tapering at one or more ends of the tension spring, expanding at one or more ends of the tension spring, tapering in the middle of the tension spring, curving along the main body of the tension spring into an overall C-shape, curving the main body of the tension spring near one or both of the ends of the tension spring to any angle and/or any other suitable manner. By way of non-limiting illustration, FIG. 2D shows that, in some embodiments, the first end 34 and second end 38 of the tension coil 30 are tapered (e.g., to make the orthodontic spring 10 comfortable on the cheeks, gums, and/or tongue of the patient and/or to help the tension spring not unduly contact one or more brackets 18, archwires 16, and/or other orthodontic components).

Where one or more ends (e.g., ends 34 and/or 36) of the tension coil spring 30 taper, the ends can taper in any suitable manner. Indeed, in some embodiments, the ends are tapered to have a conical shape, a hemispherical shape, a parabolic shape, beehive shape, a symmetrical shape, an asymmetrical shape, a polygonal shape, an irregular shape, and/or any other suitable shape. By way of non-limiting illustration, FIGS. 2A-2D show some embodiments in which the first 34 and second 38 ends of the tension spring 30 have a substantially parabolic and/or conical shape.

The tension coil spring 30 can have any suitable maximum outer diameter or outer width OW that allows the tension spring to function as described herein. In some embodiments, the maximum outer diameter or width of the tension coil spring is less than about 8 mm. Indeed, in some embodiments, the maximum outer diameter of the tension spring is any suitable width less than about 6 mm. In some cases, for instance, the tension coil spring has a maximum outer width of about 3 mm (±0.5 mm). In some other cases, the tension coil spring has a maximum outer diameter width of about 2 mm (±0.5 mm).

In some embodiments in which the tension coil spring 30 is not cylindrical, the tension spring can have any suitable dimensions that fall within the aforementioned outer widths OW. Indeed, in some embodiments in which the tension coil spring has a square prismatic shape (e.g., as shown in FIG. 3B), the tension spring has a maximum outer width OW of 4 mm±1 mm (or any other suitable width) and a height OH of 2 mm±1 mm (or any other suitable width). In any case, different outer widths of the tension spring can give that spring a variety of features. For instance, larger diameter coils can, in some embodiments, ensure that the patient would bite on the tension spring's coils less because the coils are relatively large and deflect out of an occlusion as the tension spring functions. Moreover, in some cases, in which the tension spring has relatively small diameter coils, the coils can be configured to apply little to no pressure to a patient's gums and/or inner cheeks.

Figure 2E:
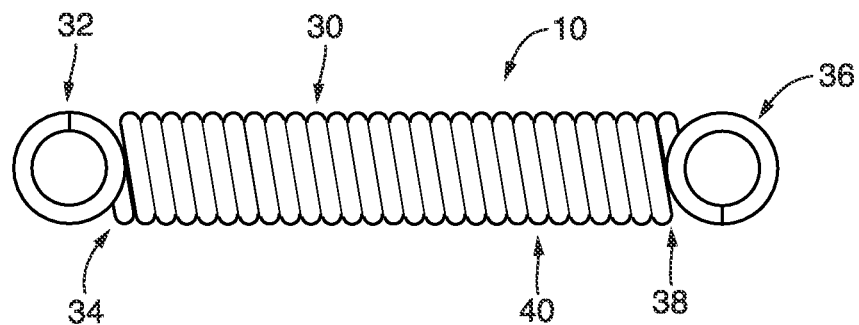
FIGS. 2E-2F respectively shows a front and a side elevation view of a representative embodiment in which the orthodontic spring comprises a closed coil tension spring.
Figure 2F:
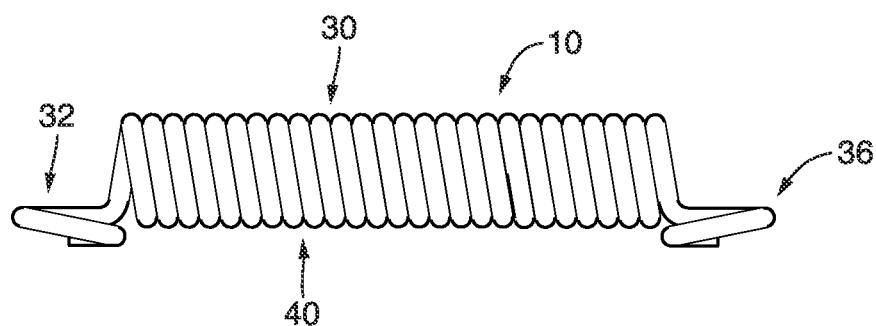
Figure 2G:
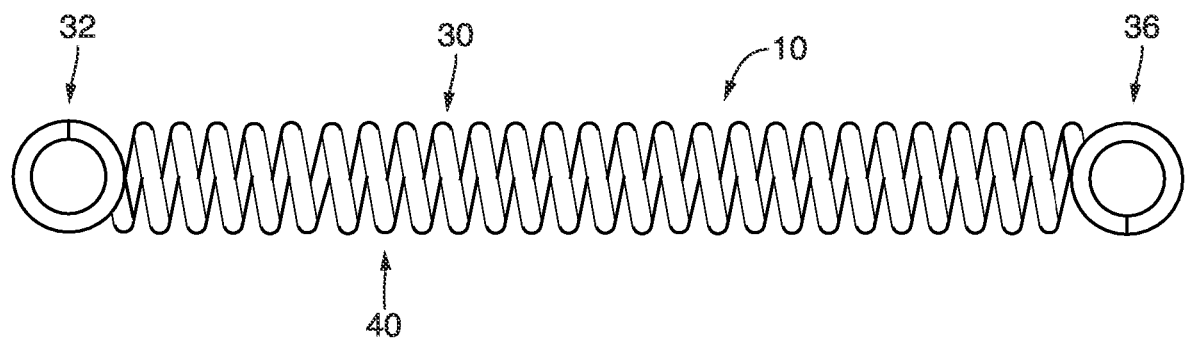
FIG. 2G shows a front elevation view of a representative embodiment in which the orthodontic spring comprises an open coil tension spring.

The coils in the tension coil spring 30 can have any suitable pitch that allows the tension coil spring to function as described herein. Indeed, in some embodiments, the tension coil spring is wound so tightly that it comprises a closed coil spring, or spring that is wound so tightly that its coils have a relatively small pitch and contact each other when the spring is at rest. By way of non-limiting illustration, FIGS. 2E-2F show some embodiments in which the tension coil spring 30 comprises a closed coil spring. In some other embodiments, however, the tension coil spring comprises an open coil spring, or a spring having coils with a relatively large pitch such that the there is a space between the coils when the spring is at rest. By way of non-limiting illustration, FIGS. 2A-2D and 2G show some embodiments in which the tension coil spring 30 comprises an open coiled spring. In this regard, by comprising an open coil spring, the tension coil can provide any suitable feature. Indeed, in some embodiments, by maintaining a space between the coils when the spring is at rest, the tension coil spring is configured to not capture and pinch portions of the patient's inner cheeks, tongue, and/or gums when the tension coil spring operates.

The tension coil spring 30 can be configured to exert any suitable amount of force that allows it to be used in place of one or more orthodontic elastics. Indeed, in some embodiments, the tension coil spring is configured to exert roughly the same amount of force as a dental elastic. In some embodiments, when the orthodontic spring 10 is stretched under normal conditions in a patient's mouth (e.g., stretched to any suitable length that is less than about 50 mm, such as about 30 mm or less, depending on the length of the orthodontic spring) the tension spring is configured to provide up to between about 1 gram/cm$^2$ and 300 gram/cm$^2$ of force (or any subrange thereof). Indeed, in some embodiments, when the tension coil spring is stretched during use in a patient's mouth, the tension coil spring is configured to provide up to between about 55 gram/cm$^2$ and about 230 gram/cm$^2$.

The wire used to form the tension coil spring 30 (and/or any other suitable portion of the orthodontic spring 10) can have any suitable characteristic that allows the orthodontic spring to function as described herein. For instance, the wire can be of any suitable thickness that allows the orthodontic spring to function as described herein. In some embodiments, the wire 44 has a maximum outer diameter or outer width OW (e.g., as shown in FIGS. 4A-4D) of between about 0.01 mm and about 2 mm (or within any subrange thereof). Indeed, in some embodiments, the wire has a maximum outer diameter or width of about 0.25 mm±0.5 mm.

The wire 44 that is used to create the tension coil spring 30 and/or any other suitable portion of the orthodontic spring 10 (e.g., the first coupler 32, the second coupler, and/or any other suitable portion of the orthodontic spring) can have any suitable cross-sectional shape (e.g., cross-sectional shape that is taken perpendicular to a longitudinal axis of the wire when it is straight) that allows the orthodontic spring to function as intended. Some non-limiting examples of suitable cross-sectional shapes include a shape that is substantially circular, ovular, elliptical, rectangular, square, triangular, polygonal, C-shaped, D-shaped, rounded raindrop shape, symmetrical, asymmetrical, egg-shaped, pill-shaped, and/or any other suitable shape. By way of non-limiting illustration, FIGS. 4A-4G respectively show some embodiments in which the wire 44 has a circular, rectangular, elliptical, crescent-moon, elongated capsule, square, and D-shaped shape.

With reference now to the couplers (e.g., the first 32, second 36, and/or any other number of couplers), the couplers can comprise any suitable characteristic that allows them to couple the orthodontic spring 10 to one or more anchors (e.g., anchors 12 and 20). In some embodiments, the first and/or second coupler each comprise one or more loops, eyelets, grommets, hooks, clips, screws, threaded sockets, bends in the wire, and/or any other suitable components that are configured to couple one or more tension coil springs 30 to one or more anchors (e.g., 12 and/or 20). By way of non-limiting illustration, FIGS. 2A-2D, 5A-5B, and 6A-6B show some embodiments in which the first 32 and second 36 couplers each comprise a loop of the wire 44. Additionally, FIGS. 7A-7D show some embodiments in which one or more of the couplers (e.g., the first coupler 32) comprises one or more coils 46. Moreover, FIG. 8A shows an embodiment in which the second coupler 36 comprises a bend in the wire 44, with the bend being configured to be coupled to an anchor (e.g., anchor 12 and/or 20).

Figure 6A:
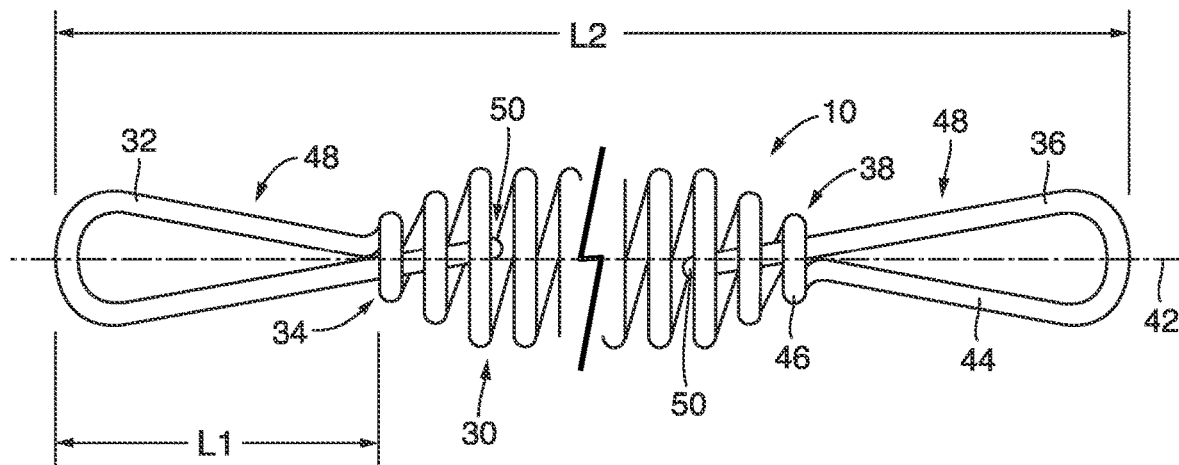
FIG. 6A depicts a front elevation view of the orthodontic spring in accordance with a representative embodiment.
Figure 6B:
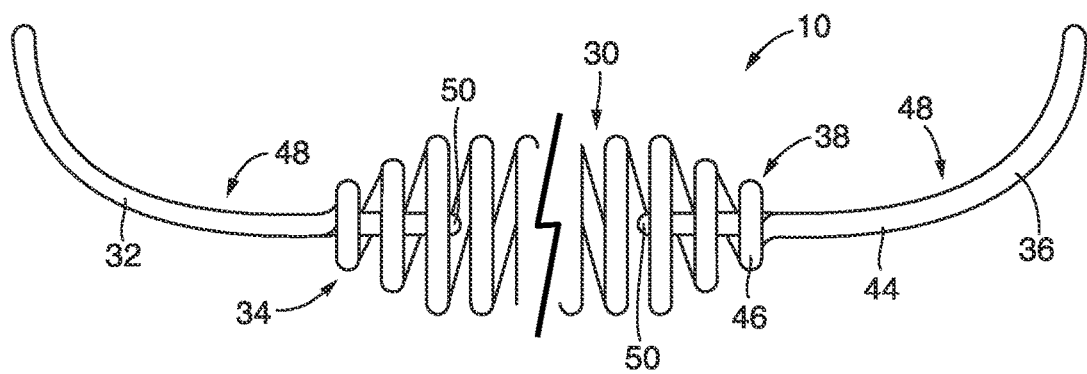
FIG. 6B depicts a side elevation view of the orthodontic spring in accordance with a representative embodiment.
Figure 7A:
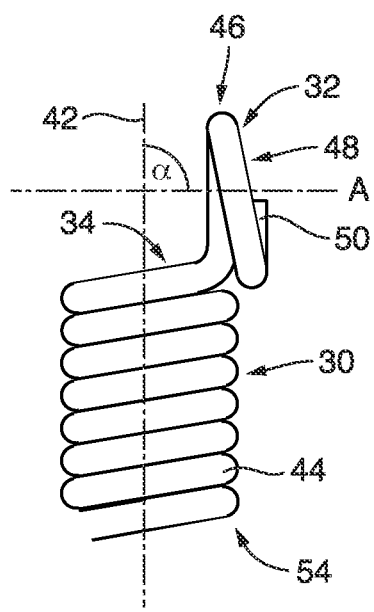
FIG. 7A depicts a side elevation view of an end of the orthodontic spring in accordance with a representative embodiment.
Figure 7B:
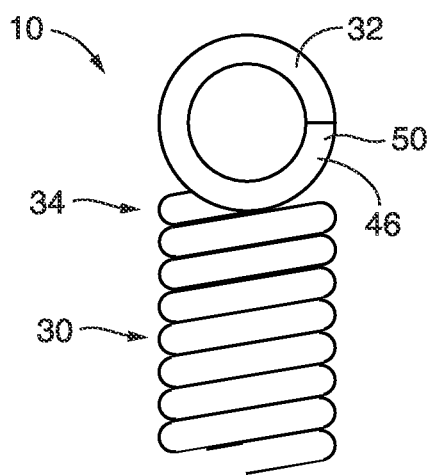
FIG. 7B illustrates a front elevation of the end of the orthodontic spring of FIG. 7A.
Figure 7C:
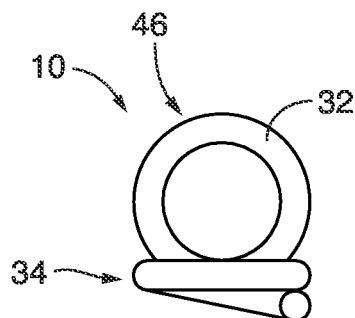
FIG. 7C illustrates a back elevation of the end of the orthodontic spring of FIG. 7A.

In some embodiments, one or more of the couplers (e.g., the first 32, the second 36, and any other suitable coupler 48) comprises discrete components that are coupled together with the tension coil spring 30 (e.g., via crimping, bending, welding, a frictional engagement, a treaded engagement, a mechanical engagement, a catch, and/or in any other suitable manner). In some other embodiments, however, one or more of the couplers are integrally formed with the tension coil spring. By way of non-limiting illustration, FIGS. 5A-7D show some embodiments in which the first coupler 32, the tension coil spring 30, and the second coupler 36 all comprises one continuous piece of wire 44. Similarly, FIGS. 8A-8B show some embodiments in which the all of the components of the orthodontic spring 10 (including multiple tension coil springs 30 and more than two couplers 48, as discussed below) comprise one continuous wire 44.

Where the couplers 48 are integrally formed with the tension coil spring 30, the couplers can be formed in any suitable manner. Indeed, in some embodiments, a portion of the wire 44 extends from an end (e.g., end 34 and/or end 38) of the tension coil spring and is then bent back to form a hook, bend, and/or a loop. In some cases, when the wire bends back to form a hook (e.g., bends back towards the tension coil spring), a terminal end of the wire is coupled to the wire (e.g., wraps around, is welded to, and/or is otherwise coupled to the wire, one or more of the coils 46, a portion of the coupler, and/or to any other suitable portion of the orthodontic spring 10). In some other embodiments, however, a terminal end of the wire is not directly coupled back to a portion of the orthodontic spring 10. By way of non-limiting illustration, FIGS. 6A-6B show some embodiments in which the couplers 48 comprise a portion of the wire 44 that extends from the tension coil spring 30 and bends back such that a terminal end 50 of the wire 44 extends into a lumen 52 of the tension coil spring (e.g., in past the closest coil 46 to the coupler) when the orthodontic spring is at rest. Additionally, FIG. 7A shows an embodiment in which the coupler 48 comprises a coil 46 having the terminal end 50 that ends on, and is disposed at, that coil.

The couplers 48 can extend from the tension coil spring 30 in any suitable manner that allows the orthodontic spring 10 to function as described herein. In some embodiments, one or more couplers are configured to extend from the tension coil spring at or adjacent to the longitudinal axis 42 of the tension coil spring. By way of non-limiting illustration, FIG. 6A shows an embodiment in which the first coupler 33 initiates and terminates adjacent to the longitudinal axis 42 of the tension coil spring 30.

In some other embodiments, however, the couplers 48 can be disposed in any other suitable location at one or more ends (e.g., ends 34 and/or 38) of the tension coil spring 30. For instance, FIG. 7A shows an embodiment in which a coupler 48 extends at or adjacent to a lateral perimeter 54 of the tension coil spring 30.

The couplers 48 can have any suitable configuration that allows them to couple the tension coil 30 to one or more anchors (e.g., anchors 12 and 20). In some embodiments, a portion of the couplers are configured to extend perpendicular to the longitudinal axis 42 of the tension coil spring; to extend parallel to the longitudinal axis of the tension spring; to extend at an angle with respect to the longitudinal axis of the tension spring; to be bent, curve, bowed, leaned, and/or otherwise to diverge from the longitudinal axis of the tension coil spring (or at least from the longitudinal axis of the majority of the coils in the tension coil spring).

Figure 5A:
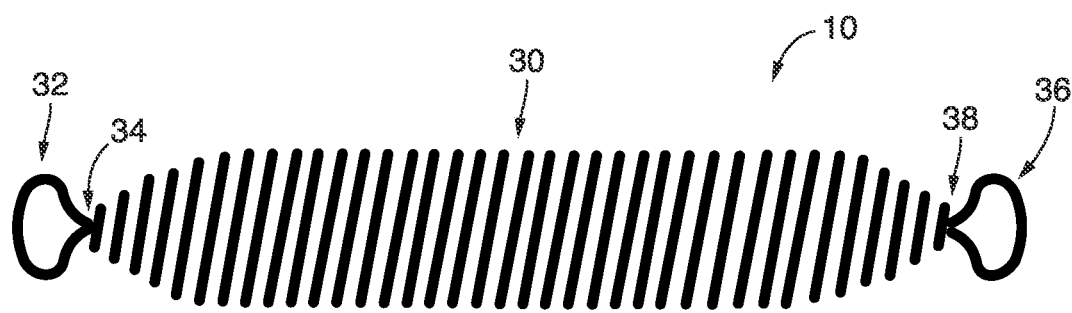
FIG. 5A depicts a front elevation view of the orthodontic spring in accordance with a representative embodiment.
Figure 5B:
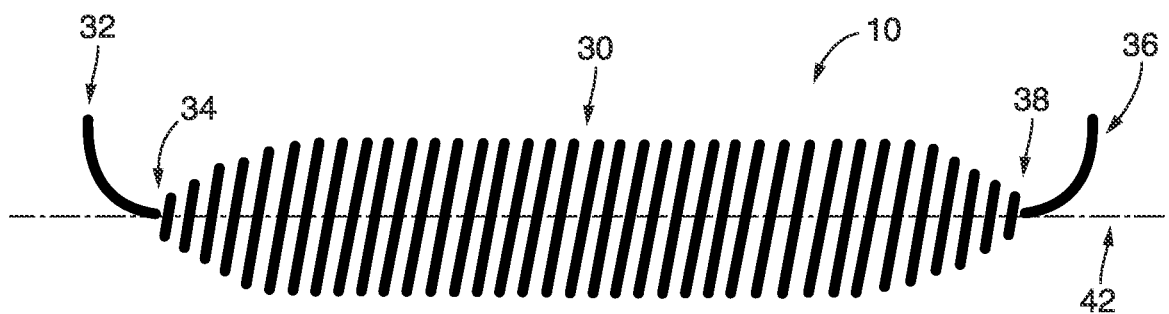
FIG. 5B illustrates a side elevation view of the orthodontic spring in accordance with a representative embodiment.
Figure 5C:
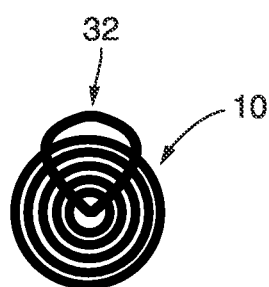
FIG. 5C depicts a plan, end view of the orthodontic spring in accordance with a representative embodiment.

By way of non-limiting illustration, FIGS. 5B and 6B show some embodiments in which one or more couplers 48 are configured to bend laterally away from the longitudinal axis 42 of the tension coil spring 30. In this regard, while the couplers (e.g., the first 32, second 36, and/or any other suitable coupler 48) can extend to any lateral side of the tension coil spring (including, without limitation, to different lateral sides of the tension spring), FIGS. 5B and 6B show some embodiments in which the first 32 and second 36 couplers each extend away from the longitudinal axis 42 of the tension coil spring 30 and towards the same lateral side of the tension spring 30. Thus, in some such embodiments, the orthodontic spring 10 can easily be coupled to a pair of braces (e.g., without twisting the orthodontic spring) and/or the couplers can help to hold the tension coil spring away from the patient's gums and teeth.

Figure 7D:
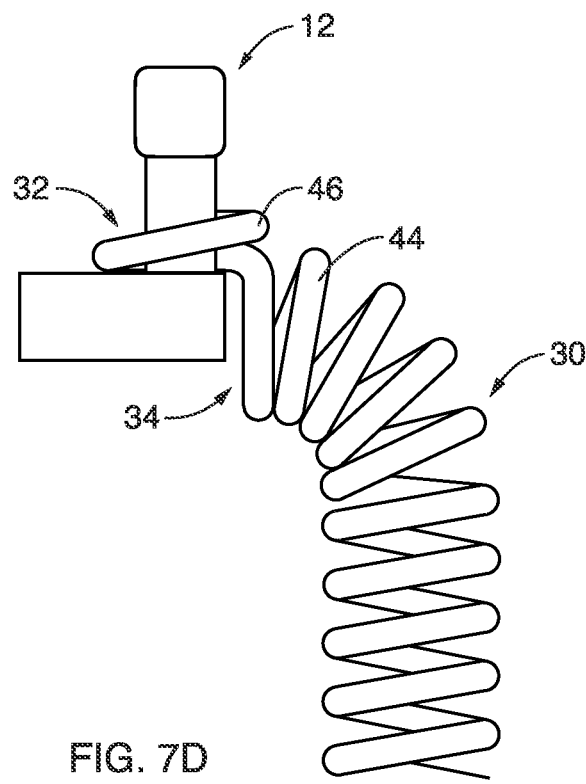
FIG. 7D illustrates a side elevation view of the orthodontic spring of FIG. 7A coupled to an anchor in accordance with a representative embodiment.

In another non-limiting illustration, FIG. 7A shows an embodiment of the orthodontic spring 10 in which one or more couplers 48 (e.g., a coil 46 or first coupler 32) extend at an angle with respect to the longitudinal axis 42 of the tension coil spring 30, when the tension spring is at rest. In this regard, while one or more couplers can extend at any suitable angle with respect to the longitudinal axis, in some embodiments, a radial, central, and/or other axis A (e.g., as shown in FIG. 7A) of the coupler runs at an angle between about 1 degree and about 270 degrees (or within any subrange thereof) with respect to the longitudinal axis of the tension coil spring. Indeed, in some embodiments, a radial axis A of one or more couplers runs at an angle α (e.g., as shown in FIG. 7A) that is between about 60 degrees and about 120 degrees with respect to the longitudinal axis of the tension coil spring. By way of non-limiting illustration, FIG. 7A shows an embodiment in which the radial axis A of a coupler 48 runs at an angle that is about 90 degrees±10 degrees with respect to the longitudinal axis 42 of the tension coil spring 30. In this regard, having one or more couplers extend at an angle (e.g., perpendicular) to the longitudinal axis of the longitudinal axis of the tension coil spring can provide the orthodontic spring with a variety of features. Indeed, in some cases, by having end coils extend at a lateral side and at an angle to the longitudinal axis of the tension coil spring, the orthodontic spring is configured to allow the end coil (or coupler) to lay substantially flush with the top of a bracket 18 after looping around the hook (or anchor), thus allowing the end coil or coupler to help hold the tension coil spring 30 away from the patient's teeth and gums during use (e.g., as shown in FIG. 7D).

The couplers 48 can extend any suitable distance from the tension coil spring 30 (e.g., the last coil at an end, such as end 34 or 38, of the coil 46 from which the coupler extends). For instance, the couplers can extend a length L1 from the tension spring (e.g., as shown in FIG. 6A) between about 0.1 mm and about 2 cm (or within any subrange thereof). Indeed, in some embodiments, each coupler is configured to be between about 1 mm and about 5 mm in length L1 (e.g., about 3 mm±0.5 mm).

The orthodontic spring 10 can be any suitable length from end to end. Indeed, in some embodiments in which the orthodontic spring comprises a single tension coil spring 30 that is flanked by two couplers (e.g., the first 32 and second 36 couplers), the total length L2 (as shown in FIG. 6A) of the orthodontic spring (e.g., from an end of the first coupler 32 to an end of the second coupler 36) when the spring is at rest is between about 5 mm and about 35 mm (or within any subrange thereof). In some embodiments, when the orthodontic spring is at rest, its total length L2 is about 10 mm±2 mm. In some other embodiments, when the orthodontic spring is at rest, its total length L2 is about 15 mm±2 mm. In yet other embodiments, when the orthodontic spring is at rest, its total length L2 is about 20 mm±2 mm. In some other embodiments, its total length is about 23 mm±2 mm. In still some other embodiments, the total length of the orthodontic spring is 27 mm±2 mm. In this regard, the different lengths of the orthodontic spring can be used for a variety of purposes. For instance, a long (e.g., 27 mm) and/or a medium (e.g., 23 mm) length orthodontic spring can be used for some Class III treatments, while a medium (e.g., 23 mm) and/or a short (e.g., 20 mm) orthodontic spring can be used for some Class II treatments.

In addition to the aforementioned components and characteristics, the described orthodontic spring 10 can be modified in any manner that allows it to be coupled to an upper 15 and/or lower 23 dental arch and/or to help move teeth and/or jaw alignment. In one example, instead of having a single tension coil spring 30 (e.g., as shown in FIGS. 2A-2D), some embodiments of the orthodontic spring include 2, 3, 4, 5, 6, 7, or more tension coil springs.

By way of non-limiting illustration, FIG. 8A shows an embodiment in which the orthodontic spring 10 comprises two tension coil springs 30. While such an orthodontic spring can have any suitable configuration (e.g., being substantially straight), FIG. 8A shows that, in some embodiments, such an orthodontic spring has a V-shaped appearance. In this regard, such an orthodontic spring is configured to: have a first coupler 32 couple to an anchor on a first dental arch (e.g., either the upper 15 or the lower 23 dental arch), have a second coupler 36 couple to an anchor on a second dental arch, and have a third coupler 56 couple to another anchor on the first dental arch.

As another example, FIG. 8B shows an embodiment in which the orthodontic spring 10 comprises three tension coil springs 30, with a coupler 48 (e.g., the second coupler 36 and the third coupler 56) being disposed between adjacent tension coils and a coupler (e.g., the first coupler 32 and the fourth coupler 58) being disposed at the ends of the orthodontic spring 10. While such an orthodontic spring can have any suitable configuration (e.g., being substantially straight), FIG. 8B shows that, in some embodiments, such an orthodontic spring has a square or three-sided appearance. In this regard, such an orthodontic spring is configured to: have its first coupler 32 couple to an anchor on a first dental arch (e.g., either the upper 15 or the lower 23 dental arch), have its second coupler 36 couple to an anchor on a second dental arch, have its third coupler 56 couple to another anchor on the second dental arch, and have its fourth coupler 58 couple to another anchor on the first dental arch. In this regard, it should be noted that while a longer tension spring (e.g., a single tension spring that extends between only two couplers 48) could be used in the configurations mentioned above with respect to FIGS. 8A-8B (e.g., by having its continuous coils wrapped across multiple anchors), by instead having the tension coil springs be separated by one or more couplers (e.g., the second 36 and/or third 56 couplers) the orthodontic spring shown in FIGS. 8A-8B can have their respective couplers 48 couple to multiple anchors (e.g., anchors 12 and/or 20) without having coils 46 from the orthodontic springs get entangled with the archwire (e.g., 16 or 24), the anchor, and/or an archwire coupler (e.g., ligature, power chain, ligature chain, tie wire, and/or any other suitable type of structure that is capable of coupling the archwire to a bracket).

As another example of a suitable modification, in some embodiments, one or more tension coil springs 30 of the orthodontic spring 10 comprise one or more internal tension coils (or internal coils) that (in some embodiments) extend between two couplers 48 and that are at least partially disposed within (and/or that extend into) a lumen 52 of a tension coil spring. By way of non-limiting illustration, FIG. 8C shows an embodiment in which an internal coil 60 (e.g., an internal tension coil 61, as shown in FIG. 8E) is disposed at repeated intervals, irregular locations, and/or with any other suitable spacing within the lumen 52 of the tension coil spring 30.

Moreover, FIGS. 8D-8E show some embodiments of such a tension spring 30. In particular, FIG. 8E shows that, in some embodiments, a portion of the spring 30 that is labeled as A extends into the page and down to the portion of the spring that is labeled as B, which, in turn, is coming out of the page and coiling back up to the portion of the spring that is labeled as C, with such portion coiling back into the page and down to the portion of the spring that is labeled as D, and with such pattern continuing on in this drawing to the portion of the spring that is labeled as KK. In this regard, FIG. 8E shows that, in some cases, the spring 30 comprises multiple internal coils 60 (e.g., internal tension coils 61) that are at least partially disposed within the spring's lumen 52 (e.g., the portions of the coils that extend between O and P, U and V, AA and BB, and GG and HH).

Additionally, while the tension spring 30 can have any suitable configuration, FIGS. 8D-8E show that, in some embodiments, one or more portions of the spring 30 comprise one internal tension coil 61 (e.g., the portion of the spring labeled O and P, as shown in FIG. 8E) that spans across roughly two external coils 67 (e.g., the coils labeled in FIG. 8E as 68 and 69). In other words, some portions of the spring comprise one internal coil for two corresponding external coils. In some other embodiments, however, one or more portions of the spring comprise one internal coil for 1, 3, 4, 5, 6, 7, 8, and/or any other suitable number of external coils. Additionally, while a full length of the spring can include the internal coils, FIGS. 8D and 8E show some that, in some embodiments, one or more portions of the spring 30 (e.g., portion 71) do not include an internal coil. In this regard, the internal coils can be disposed in any suitable portion of a spring, including, without limitation, throughout an entire length of the spring, at one or both ends of the spring, at any location between the two ends of the spring, and/or in any other suitable location.

While FIGS. 8D and 8E show some embodiments in which the internal coils 60 are disposed in a tension spring 30, the internal coils can be used in any other suitable type of coil spring. Indeed, in some embodiments, one or more internal coils are disposed within a lumen 52 of a compression spring (e.g., a spring that has spacing between one or more of its coils when it as rest) and/or a torsion spring. In this regard, FIGS. 8D and 8E not only show an embodiment of a tension spring 30 at rest, but they also show an embodiment of a compression spring 72 that is fully compressed (and/or of a tension spring).

When one or more internal coils 60 are used for a tension spring 30, a torsion spring, and/or a compression spring 72 (with a tension, torsion, and/or a compression spring having one or more of the described internal coils being referred to herein as a supercoil spring), the internal coils 60 of the supercoil spring can pass into the lumen 52 of the supercoil spring (e.g., the tension spring 30 and/or any other suitable type of supercoil spring) in any suitable location. Indeed, in some embodiments (e.g., as shown in FIGS. 8C-8E), multiple internal coils 60 extend into the spring's lumen 52 at roughly the same radial location as each other. In some such embodiments, the spring (e.g., which can resemble the spring 30 shown in FIGS. 8C-8E) can be described as having a spine (e.g., having each of its internal coils extending into the lumen of the spring at the same (and/or at a similar) radial location). In some other embodiments, however, the radial locations at which different internal coils extend into the lumen vary from one internal coil to another. In this regard, the radial location at which the various coils extend into the lumen can be offset from each other by any suitable spacing. Indeed, in some embodiments, the point at which one internal coil extends into the lumen can be offset from the point at which another internal coil extends into the lumen by between about 1 degree and about 359 degrees (or within any subrange thereof). By way of non-limiting example, the radial location at which one internal coil extends into the lumen can be offset from the radial location at which another internal coil extends into the lumen by about 60 degrees±10 degrees.

The supercoil spring can further have any suitable number of layers of internally nested internal coils 60. By way of non-limiting illustration, FIGS. 8C-8E show some embodiments in which the spring (e.g., tension spring 30) comprises a single internal layer of internal coils 60. In some other embodiments, however, one or more internal coils in the spring further comprise one or more additional internal coils (or additional internal coils that extend at least partially into a lumen 52 defined by the internal coil(s)). For instance, in some embodiments, the supercoil spring comprises a plurality of external coils 67 that define an inner lumen 52, with one or more internal coils 60 extending from the external coils 67 (e.g., as shown in FIGS. 8C-8E). In some such embodiments (not shown), one or more of the internal coils further comprise and/or are connected to one or more nested internal coils that extend from a corresponding internal coil, and are at least partially disposed within a lumen of one or more of the internal coils. Moreover, in some embodiments, one or more of such nested internal coils further comprise (or extend into) one or more additional internally nested internal coils that are at least partially disposed within an internal lumen of one or more of the nested internal coils (with such internal nesting continuing on for as many levels of internal coils as desired).

Where the supercoil spring includes more than a single layer of internal coils 60 (e.g., the internal coils 60, the nested internal coils, the additional internally nested internal coils, etc.), the coils of various layers of the internal coils (e.g., the nested internal coils, the additional internally nested internal coils, etc.) can span or extend across (e.g., as discussed above with respect to the internal coils 60) as many coils of the next external set of coils as is possible to allow the supercoil spring to function (e.g., spanning across 1, 2, 3, 4, 5, 6, 7, or more coils of the next external set of coils).

The supercoil spring can provide a variety of features. Indeed, in some cases, by having one or more internal coils, some embodiments of the supercoil spring: comprise a longer length of wire than the spring would have with simply an outer tension coil and no internal coils; are able to provide more flexibility than would otherwise be provided by a tension spring, a compression spring, and/or a torsion spring without the internal coils; help the force of the supercoil spring be more consistent as the supercoil spring is stretched (or compressed where the supercoil comprises a compression spring); can allow for the tension coil spring to be shorter while still providing a desired elasticity; can allow for less opening between outer coils leading to less chance of pinching the patient's cheek; can allow for the inner and outer coils to stretch open at different rates allowing for food trapped on or in the spring to be broken up easier; and/or can provide a variety of other features. Indeed, in some embodiments, by having the internal coils in the supercoil spring, the supercoil spring can be configured to stretch between about 2% and about 200% more (or within any subrange thereof) than could the same spring without the internal coils. For instance, some embodiments of the supercoil spring are between about 30% and about 60% more stretchy than would the same spring be should such spring lack any internal coils.

In addition to the aforementioned features, the described supercoil spring can have any other suitable component or characteristic, including, without limitation, any component or characteristic described herein for use with any other embodiment (e.g., couplers 48, shapes, sizes, wire types, elasticities, configurations, uses, etc.). Moreover, in some embodiments, the supercoil spring includes one or more rods that extend into the lumen 52 of the spring (e.g., along a longitudinal axis of the spring). Additionally, while some embodiments of such supercoil springs are configured for use in orthodontic applications, such springs can be modified for use in any other suitable application that involves a tension spring and/or a compression spring. In this regard, some non-limiting examples of such applications include use of one or more supercoil springs in gas springs, automobiles, automobile shocks, struts, bicycle shocks, mattress springs, and/or in any other suitable location. Indeed, in some cases, where space is limited but the need for elasticity is relatively high, the supercoil can be the spring of choice.

In addition to the aforementioned features, the described orthodontic spring 10 (the various embodiments described herein) can provide its users with a variety of other features. For instance, unlike some conventional orthodontic elastics that require a person to put a finger or tool in the patient's mouth to remove and/or replace the elastic (something that can be unsanitary), some embodiments of the described orthodontic spring can last significantly longer than can some conventional orthodontic elastics. Thus, not only can some embodiments of the described orthodontic spring be more convenient to use, their use can also be more sanitary than some conventional elastics.

As another feature, some embodiments of the described orthodontic spring 10 are configured to remain in a patient's mouth for the entire time between visits to the orthodontist's office. In contrast, some conventional orthodontic elastics are intended to be removed (e.g., if they break, after they lose elasticity, during meals, while brushing, one or multiple times daily, etc.). In many such cases, once the elastic is removed, the patient (or the patient's caregiver) may forget about replacing the elastic (or may even choose not to replace the elastic for an extended period of time). Thus, in some such cases, when the patient (or the patient's caregiver) does not replace the elastics as prescribed, the corresponding orthodontic treatment may take longer to be accomplished and/or may not be accomplished as desired. In contrast, because some embodiments of the described orthodontic spring are configured to retain their elasticity and to be kept in a patient's mouth for relatively long periods of time, such embodiments can provide desired treatments in shorter periods of time, more effectively, and/or with less frustration than may otherwise be achieved.

As still another feature associated with some embodiments of the described orthodontic spring 10, some competing devices are prone to break and to thereby cause pain to their wearer. Additionally, some competing devices are prone to fatigue relatively quickly. In contrast, some embodiments of the described orthodontic spring are configured to not break or significantly fatigue under normal use. Again, such features allow some embodiments of the described orthodontic spring to: remain in a patient's mouth longer, be more comfortable to use, be more resistant to strain hardening, have a higher fatigue life (e.g., not failing after thousands of cycles of the spring), require shorter treatment times, provide more predictable results, provide more versatility for attachment points and configurations, and/or to otherwise be more effective than some conventional orthodontic elastics.

Additionally, some competing devices can have screw stops (and/or other coupling devices) coupled at one end of a spring, with such screw tops (or other coupling devices) being difficult to use, subject to braking off, and/or requiring special equipment to couple such devices to braces. In contrast, some embodiments of the described orthodontic spring 10 have a coupler 48 that is integrally formed with and coupled to the other components of the orthodontic spring. Moreover, because of the shape and configuration of the couplers included in the described orthodontic spring, the orthodontic spring can be used virtually anywhere that a conventional orthodontic elastic can be used. For instance, some embodiments of the described orthodontic spring can replace conventional Class 1 elastics (e.g., to close spaces between teeth on the same dental arch), Class II elastics (e.g., to correct overbites), Class III elastics (e.g., to correct underbites), vertical elastics (e.g., to keep teeth together), front cross elastics (e.g., to correct a midline), Class II triangles, seating elastics, Class III triangles, V elastics, posterior box elastics, anterior vertical elastics, and/or any other suitable type of orthodontic elastics.

Moreover, in addition to being used with traditional metal braces, the described orthodontic spring 10 can be used with any other suitable orthodontic equipment. By way of non-limiting example, some embodiments of the orthodontic spring are configured to be used with gold-plated braces, stainless steel braces, lingual braces, titanium braces, progressive braces, clear removable aligners, self-ligating braces, customized orthodontic treatment systems, clear braces, retainers, Carriere appliances, headgear, extra-oral orthodontic devices, impacted teeth having bracket placed thereon, and/or any other suitable type of orthodontic equipment.

The described orthodontic spring 10 can be used in any suitable manner that allows it to function as intended. For instance, in some embodiments, a coupler 48 of the orthodontic spring is placed over a portion of an anchor (e.g., anchors 12 or 20), with the coupler being held in place by the tension applied to the coupler on the anchor by the tension coil spring 30. In some other embodiments, however, one or more couplers of the orthodontic spring are held on corresponding anchors by the use of one or more archwire couplers (e.g., ligatures, bracket elastics, twisted wires, tie wires, power chains, ligature chains, and/or any other suitable coupler that is configured to couple the archwire to the bracket and/or any other suitable portion of a brace), ties, wraps, and/or any other suitable orthodontic spring bindings that are configured to couple a portion of one of the orthodontic spring's couplers to an anchor.

Figure 9A:
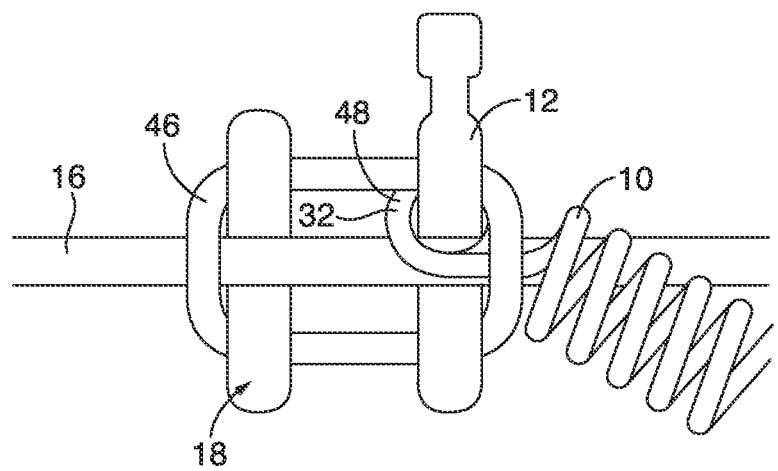
FIG. 9A depicts a bracket comprising an anchor, wherein an orthodontic archwire is coupled to the bracket with an archwire coupler, and wherein a portion of a first coupler of the orthodontic spring is disposed between the archwire and the archwire coupler in accordance with a representative embodiment.

Indeed, in accordance with some embodiments, FIG. 9A shows that an archwire (e.g., archwire 16) is coupled to a bracket 18 through the use of an archwire coupler 62 (e.g., a ligature). In this regard, while the coupler 48 of the orthodontic spring 10 can be disposed over the anchor 12 and the archwire coupler 62 (e.g., such that the coupler can be removed from the anchor without moving the archwire coupler), FIG. 9A shows an embodiment in which a portion of the first coupler 32 is sandwiched between a portion of the archwire 16 and a portion of the archwire coupler 62. Thus, in some embodiments, the orthodontic spring is held in place by one or more archwire couplers (e.g., ligature chains, power chains, ligatures, etc.) and/or other orthodontic spring bindings. Accordingly, in some such embodiments, the orthodontic spring is configured to be held in place on multiple anchors for the duration of time between a patient's visits to the orthodontist's office.

Figure 9B:
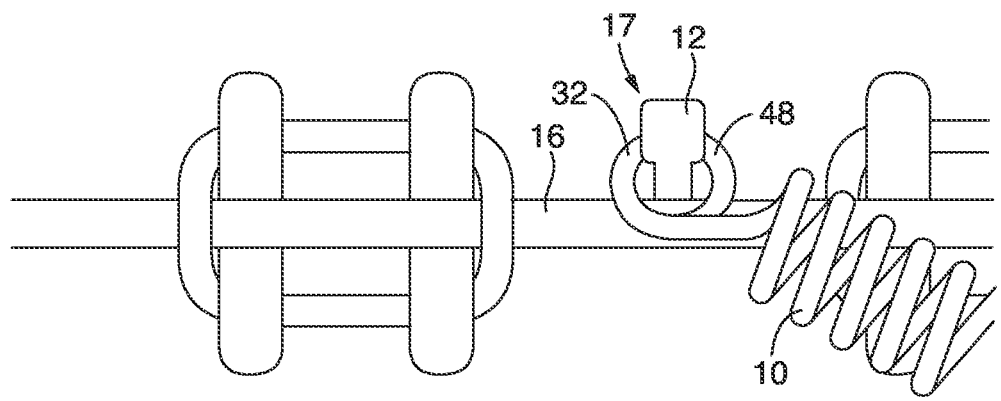
FIG. 9B depicts an archwire comprising an anchor, wherein the first coupler of the orthodontic spring couples to the anchor.
Figure 9C:
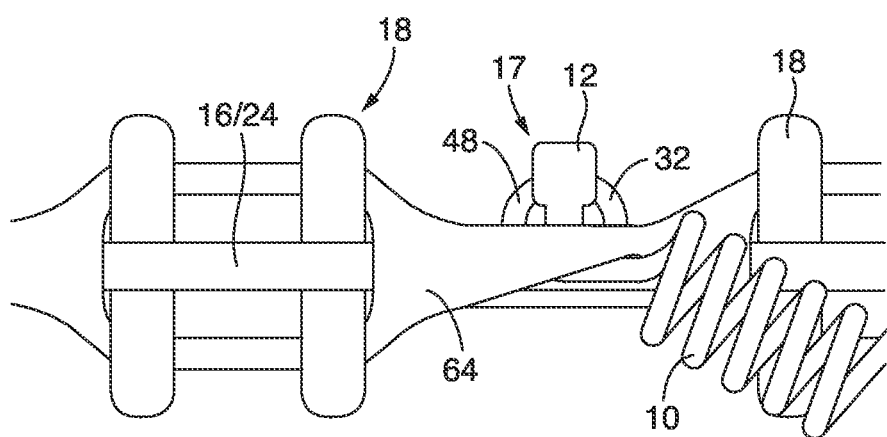
FIG. 9C depicts the archwire comprising the anchor, wherein the first coupler of the orthodontic spring couples to the anchor, and wherein a portion of a first coupler of the orthodontic spring is locked to the anchor by a ligature chain that overlaps the anchor and the first coupler in accordance with a representative embodiment.

In another non-limiting illustration, FIG. 9B shows am embodiment in which a coupler 48 of the orthodontic spring 10 is coupled to an anchor 12 (e.g., to a posted archwire 17 and/or to any other suitable type of anchor, on the upper 15 and/or the lower 23 dental arch). Moreover, FIG. 9C shows that, in some embodiments, a ligature chain 64 extends over a portion of the archwire (e.g., archwire 16), over a portion of the anchor 12 (e.g., the posted archwire 17), and over a portion of the coupler 32 (and/or 36) to couple the orthodontic spring to the anchor, with a portion of the coupler being sandwiched between the archwire and the ligature chain.

Figure 9D:
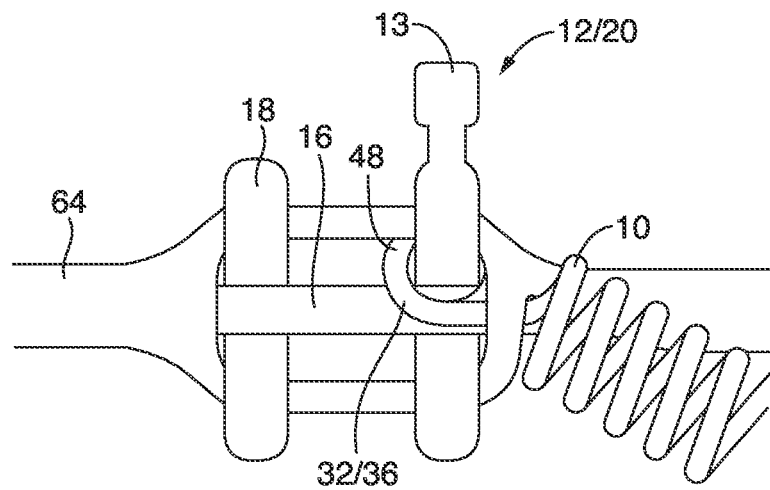
FIG. 9D depicts the bracket comprising the anchor, wherein the first coupler of the orthodontic spring couples to the anchor, and wherein a portion of a first coupler of the orthodontic spring is locked to the anchor by a ligature chain that overlaps the anchor and the first coupler in accordance with a representative embodiment.

FIG. 9D shows that, in some embodiments, an archwire (e.g., archwire 16 is coupled to a bracket 18 comprising a hook 13. Moreover, that figure shows that, in some embodiments, a coupler 48 (e.g., the first coupler 32 and/or any other suitable coupler extends over the hook 13). Additionally, that figure shows that, in some embodiments, a ligature chain 64 extends over a portion of the coupler (e.g., the first coupler 32 and/or any other suitable coupler) so as to dispose a portion of the coupler between the archwire (e.g., archwire 16 and/or any other suitable archwire) and the ligature chain 64.

Figure 9E:
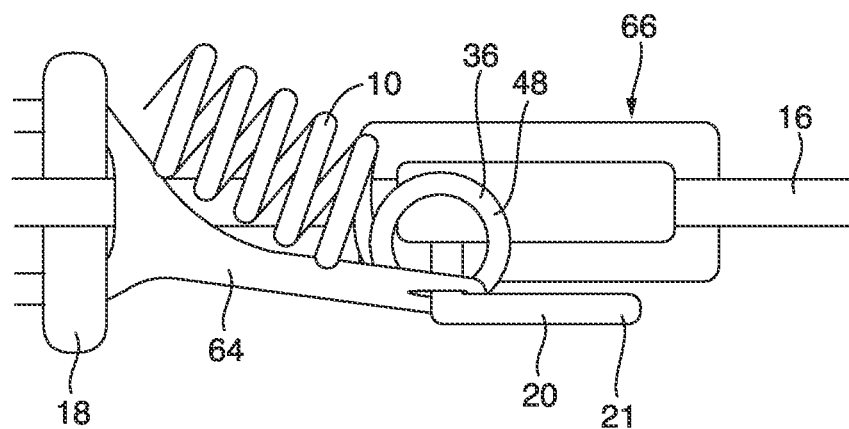
FIG. 9E depicts the molar bracket comprising the anchor, wherein the first coupler of the orthodontic spring couples to the anchor, and wherein a portion of a first coupler of the orthodontic spring is locked to the anchor by a ligature chain that overlaps the anchor and the first coupler in accordance with a representative embodiment.

FIG. 9E shows that, in some embodiments, a molar bracket 66 comprises a poking hook 21 (and/or any other suitable anchor, such as the first 12 and/or second 20 anchor). Moreover, that figure shows an embodiment in which a coupler 48 (e.g., the second coupler 36) is disposed on the poking hook 21, with the ligature chain 64 being disposed on top of a portion of the coupler 48, such that the coupler is bound onto the hook by the ligature chain 64, with the coupler being sandwiched between a portion of the bracket 66 and the ligature chain 64.

Figure 9F:
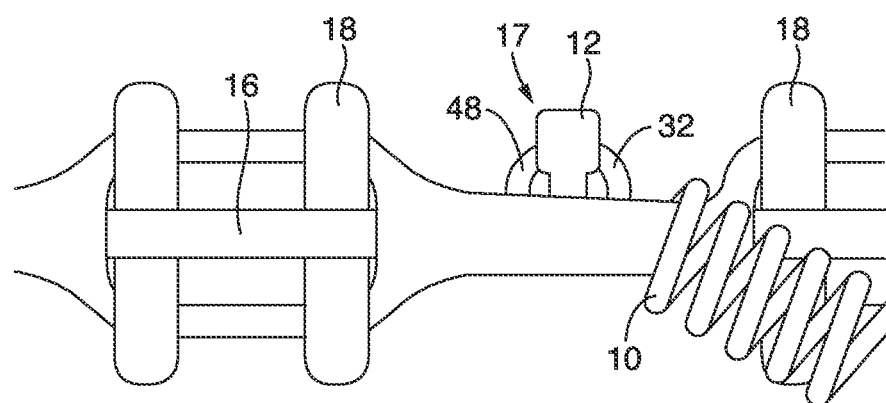
FIG. 9F depicts the archwire comprising the anchor, wherein the first coupler of the orthodontic spring couples to the anchor, and wherein a portion of a first coupler of the orthodontic spring is locked to the anchor by a power chain that overlaps the anchor and the first coupler in accordance with a representative embodiment.

Additionally, FIG. 9F shows that, in some embodiments, a power chain 63 is coupled to one or more brackets 18 and a coupler 48 (e.g., the first coupler 32) is coupled to a posted archwire 17, with the power chain 63 extending over a portion of the coupler 48 so as to lock the orthodontic spring on the anchor 12.

The described orthodontic spring 10 can comprise any suitable material that allows it to function as described herein. Some non-limiting examples of such materials include one or more: metals or alloys (e.g., nickel-titanium; copper-nickel-titanium; heat activated nickel-titanium; titanium-molybdenum; stainless steel; a mix of cobalt, chromium, nickel, molybdenum, iron, and/or magnesium; plastics, polymers, ceramics, synthetic materials, and/or other suitable materials. In some embodiments, however, the orthodontic spring comprises nickel-titanium, and/or copper-nickel-titanium). More particularly, some embodiments of the orthodontic spring comprise a continuous wire 44 comprising copper-nickel-titanium.

Thus, as discussed herein, the embodiments of the present invention relate to systems and methods for correcting flaws in tooth alignment and/or dental arch occlusion. In particular, an orthodontic spring that is configured to extend between an upper and lower dental arch is discussed. While the orthodontic spring can include any suitable feature, in some cases, it includes a first tension coil spring, a first coupler that is disposed at a first end of the first tension coil spring and that is configured to couple to a first anchor that is coupled to a first dental arch. In some cases, the orthodontic spring further comprises a second coupler that is disposed at a second end of the first tension coil spring and that is configured to couple to a second anchor that is coupled to a second dental arch. In some cases, the first tension coil spring, the first coupler, and the second coupler all comprise one continuous wire. In some cases, the first tension coil spring tapers at its first and second ends. Indeed, in some cases, the tension coil spring tapers between a portion of the spring that has a widest outer diameter and/or outer width (e.g., a center portion of a length of the spring) and the first coupler (at the first end) and the second coupler (at the second end).

The present systems and methods may be embodied in other specific forms without departing from their spirit or essential characteristics. The described systems, methods, embodiments, examples, and illustrations are to be considered in all respects only as illustrative and not restrictive. Any portion of any system, method, embodiment, component, characteristic, and/or other feature of the described systems and methods can be combined, mixed, and/or otherwise used with any other suitable portion of any other feature and in any suitable manner. For instance, the described tension coil springs, couplers, and/or any other feature or method described herein can be used with any other feature or method described herein, and in any suitable manner. The scope of the described systems and methods is, therefore, indicated by the appended claims rather than by the foregoing description. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object—regardless of whether the one object is directly on, attached, connected, or coupled to the other object, or whether there are one or more intervening objects between the one object and the other object. Also, directions (e.g., front, back, on top of, below, above, top, bottom, side, up, down, under, over, upper, lower, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. An orthodontic spring configured to extend between a first dental arch and a second dental arch, the orthodontic spring comprising:
   a first tension coil spring;
   a first coupler that is disposed at a first end of the first tension coil spring, the first coupler being configured to selectively and releasably couple the first tension coil spring to a first anchor that is coupled to the first dental arch; and
   a second coupler that is disposed at a second end of the first tension coil spring, the second coupler being configured to selectively and releasably couple the first tension coil spring to a second anchor that is coupled to the second dental arch,
   wherein the first tension coil spring, the first coupler, and the second coupler comprise one continuous wire,
   wherein the first coupler extends from, is adjacent to, and is contiguous with a first coil of the first tension coil spring, with the first coil being disposed at the first end of the first tension coil spring, and
   wherein the second coupler extends from, is adjacent to, and is contiguous with a final coil of the first tension coil spring, with the final coil being disposed at the second end of the first tension coil spring.

2. The orthodontic spring of claim 1, wherein an outer width of multiple coils at the first end of the first tension coil spring decrease in size between a center of a longitudinal length of the first tension coil spring and the first coupler, and wherein an outer width of multiple coils at the second end of the first tension coil spring decrease in size between the center of the longitudinal length of the first tension coil spring and the second coupler.

3. The orthodontic spring of claim 1, wherein the first coupler curves laterally along its length from a longitudinal axis of the first tension coil spring.

4. The orthodontic spring of claim 1, further comprising:
   a second tension coil spring having a third end and a fourth end; and
      a third coupler that is configured to couple to the first dental arch,
      wherein the second coupler is disposed at the third end of the second tension coil spring, wherein the third coupler is disposed at the fourth end of the second tension coil spring, and wherein the first coupler, the first tension coil spring, the second coupler, the second tension coil spring, and the third coupler comprise the one continuous wire.

5. The orthodontic spring of claim 1, wherein the orthodontic spring has a full length of less than 30 mm when the orthodontic spring is at rest.

6. The orthodontic spring of claim 1, wherein the first tension coil spring has a maximum outer width of less than 6 mm.

7. The orthodontic spring of claim 1, wherein the first tension coil spring comprises an open coil spring such that multiple coils in the first tension coil spring are separated from each other when the orthodontic spring is at rest.

8. The orthodontic spring of claim 5, wherein the first coupler comprises a portion of the one continuous wire that extends from the first end of the first tension coil spring, and is shaped such that an end of the one continuous wire extends into and terminates within a lumen of the first tension coil spring when the orthodontic spring is at rest,
wherein the first coupler extends laterally along its length from a longitudinal axis of the first tension coil spring, and
wherein the first tension coil spring has a maximum outer width of less than 6 mm.

9. The orthodontic spring of claim 1, wherein the first coupler comprises a portion of the one continuous wire that extends from the first end of the first tension coil spring, and is shaped such that an end of the one continuous wire extends into and terminates within a lumen of the first tension coil spring when the orthodontic spring is at rest.

10. The orthodontic spring of claim 1, wherein the first coupler extends from a lateral side of the first end of the first tension coil spring such that a diameter of a widest portion of the first coupler runs substantially parallel to a longitudinal axis of the first tension coil spring when the orthodontic spring is at rest.

11. The orthodontic spring of claim 1, wherein the first coupler is initiated adjacent to a longitudinal axis of the first tension coil spring.

12. An orthodontic spring assembly configured to be coupled to a first dental arch and a second dental arch, the orthodontic spring assembly comprising:
a first anchor that is configured to be coupled to the first dental arch;
a second anchor that is configured to be coupled to the second dental arch; and
an orthodontic spring comprising:
a first tension coil spring,
a first coupler that is disposed at a first end of the first tension coil spring, the first coupler being coupled to the first anchor, and
a second coupler that is disposed at a second end of the first tension coil spring, the second coupler being coupled to the second anchor,
wherein the first tension coil spring, the first coupler, and the second coupler comprise one continuous wire,
wherein the orthodontic spring has a full length of less than 40 mm when the orthodontic spring is at rest,
wherein the first tension coil spring has a maximum outer width of less than 6 mm,
wherein the first tension coil spring is configured to extend in length when a distance between the first coupler and the second coupler increases,
wherein the first coupler extends from, is adjacent to, and is contiguous with a first coil of the first tension coil spring, with the first coil being disposed at the first end of the first tension coil spring, and
wherein the second coupler extends from, is adjacent to, and is contiguous with a final coil of the first tension coil spring, with the final coil being disposed at the second end of the first tension coil spring.

13. The orthodontic spring assembly of claim 11, wherein the first coupler and the second coupler both diverge from a longitudinal axis of the first tension coil spring to a first lateral side of the first tension coil spring.

14. The orthodontic spring assembly of claim 12, further comprising:
an orthodontic archwire that is coupled to the first anchor; and
an archwire coupler that couples the orthodontic archwire and the first coupler to the first anchor,
wherein a portion of the first coupler is disposed between the orthodontic archwire and the archwire coupler.

15. The orthodontic spring assembly of claim 12, wherein an outer width of multiple coils at the first end of the first tension coil spring decrease in size between a center of a longitudinal length of the first tension coil spring and the first coupler, and wherein an outer width of multiple coils at the second end of the first tension coil spring decrease in size between the center of the longitudinal length of the first tension coil spring and the second coupler.

16. The orthodontic spring assembly of claim 12, wherein the first tension coil spring has a non-circular perimeter when viewed from a cross-sectional view that runs perpendicular to a longitudinal axis of a length of the first tension coil spring.

17. The orthodontic spring assembly of claim 12, wherein the one continuous wire comprises a non-circular profile.

18. A method for using an orthodontic spring, the method comprising:
obtaining an orthodontic spring comprising:
a first tension coil spring,
a first coupler that is disposed at a first end of the first tension coil spring, the first coupler being configured to couple the first tension coil spring to a first anchor that is coupled to a first dental arch, and
a second coupler that is disposed at a second end of the first tension coil spring, the second coupler being configured to couple the first tension coil spring to a second anchor that is coupled to a second dental arch,
wherein the first tension coil spring, the first coupler, and the second coupler comprise one continuous wire,
wherein the first coupler extends from, is adjacent to, and is contiguous with a first coil of the first tension coil spring, with the first coil being disposed at the first end of the first tension coil spring, and
wherein the second coupler extends from, is adjacent to, and is contiguous with a final coil of the first tension coil spring, with the final coil being disposed at the second end of the first tension coil spring,
coupling the first coupler to the first anchor, and
coupling the second coupler to the second anchor.

19. The method of claim 18, further comprising coupling an orthodontic archwire and an archwire coupler to the first anchor such that a portion of the first coupler is disposed between a portion of the orthodontic archwire and a portion of the archwire coupler.

20. The method of claim 18, wherein the orthodontic spring further comprises:
- a second tension coil spring having a third end and a fourth end; and
  - a third coupler that is configured to couple to a third anchor that is configured to couple to the first dental arch,
  - wherein the second coupler is disposed at the third end of the second tension coil spring,
  - wherein the third coupler is disposed at the fourth end of the second tension coil spring,
  - wherein the first coupler, the first tension coil spring, the second coupler, the second tension coil spring, and the third coupler comprise the one continuous wire, and
  - wherein the method further comprises coupling the third coupler to the third anchor.

\* \* \* \* \*